United States Patent
Xu et al.

(10) Patent No.: US 8,009,897 B2
(45) Date of Patent: Aug. 30, 2011

(54) METHOD AND APPARATUS FOR IMAGE MATCHING

(75) Inventors: Li-Qun Xu, Ipswich (GB); Bangjun Lei, Delft (NL)

(73) Assignee: British Telecommunications public limited company, London (GB)

( * ) Notice: Subject to any disclaimer, the term of this patent is extended or adjusted under 35 U.S.C. 154(b) by 1947 days.

(21) Appl. No.: 10/491,786

(22) PCT Filed: Oct. 4, 2002

(86) PCT No.: PCT/GB02/04547
§ 371 (c)(1),
(2), (4) Date: Apr. 6, 2004

(87) PCT Pub. No.: WO03/036992
PCT Pub. Date: May 1, 2003

(65) Prior Publication Data
US 2004/0240725 A1 Dec. 2, 2004

(30) Foreign Application Priority Data
Oct. 26, 2001 (GB) .................. 0125774.0

(51) Int. Cl.
G06K 9/00 (2006.01)
H04N 5/235 (2006.01)
H04N 5/228 (2006.01)

(52) U.S. Cl. ............ 382/154; 348/47; 348/51; 382/195; 382/205; 382/260

(58) Field of Classification Search .................. 382/254, 382/286–294, 278–279
See application file for complete search history.

(56) References Cited

U.S. PATENT DOCUMENTS

| 5,727,078 | A | * | 3/1998 | Chupeau | 382/154 |
| 5,818,959 | A | * | 10/1998 | Webb et al. | 382/154 |
| 6,067,373 | A | * | 5/2000 | Ishida et al. | 382/130 |
| 6,226,396 | B1 | | 5/2001 | Marugame | |
| 6,233,007 | B1 | * | 5/2001 | Carlbom et al. | 348/157 |
| 6,347,152 | B1 | * | 2/2002 | Shinagawa et al. | 382/195 |
| 6,891,644 | B1 | * | 5/2005 | Ishiguro et al. | 358/474 |
| 7,027,188 | B2 | * | 4/2006 | Takeuchi et al. | 358/2.1 |
| 7,092,015 | B1 | * | 8/2006 | Sogawa | 348/222.1 |
| 2001/0002934 | A1 | * | 6/2001 | Oosawa | 382/130 |
| 2001/0022859 | A1 | * | 9/2001 | Okabayashi et al. | 382/278 |
| 2002/0048412 | A1 | * | 4/2002 | Wredenhagen et al. | 382/278 |
| 2002/0064309 | A1 | * | 5/2002 | Shinagawa et al. | 382/206 |
| 2003/0016853 | A1 | * | 1/2003 | Oosawa | 382/132 |

OTHER PUBLICATIONS

Patent Abstracts of Japan, vol. 017, No. 118, Mar. 11, 1993 & JP 04 303704, Oct. 27, 1992. Office Action dated Aug. 19, 2010 issued in corresponding Canadian Application No. 2,460,733.

* cited by examiner

Primary Examiner — John W Lee
(74) Attorney, Agent, or Firm — Nixon & Vanderhye P.C.

(57) ABSTRACT

The invention provides a method and apparatus for performing correspondence estimation between pixels of a stereo image pair to obtain matching information for corresponding pixels in each image. To perform a match for a particular pixel in a first image firstly an adaptive curve is constructed about the pixel, being a sequence of connected pixels with similar intensity values to the pixel being matched. The adaptive curve thus constructed is then used as a matching element within the second image to find a matching pixel representative of the same 3D scene point in the second image to the particular pixel. By performing matching in this manner for every pixel in an image, accurate disparity maps can be obtained which are then used in a known image synthesis algorithm to produce novel images of a scene of improved quality.

39 Claims, 12 Drawing Sheets

(a) (b)

(a) (b)

(a) (b)

(a) (b)

| 54 | 39 | 35 | 31 | 30 | 26 | 22 |
|---|---|---|---|---|---|---|
| 101 | 90 | 77 | 57 | 44 | 37 | 31 |
| 110 | 106 | 106 | 100 | 94 | 77 | 58 |
| 109 | 108 | 109 | 107 | 106 | 103 | 99 |
| 101 | 105 | 108 | 107 | 108 | 106 | 108 |
| 59 | 69 | 91 | 101 | 106 | 107 | 109 |
| 41 | 37 | 47 | 56 | 72 | 88 | 99 |

Figure 13

| 54 | 39 | 35 | 31 | 30 | 26 | 22 |
|---|---|---|---|---|---|---|
| 101 | 90 | 77 | 57 | 44 | 37 | 31 |
| 110 | 106 | 106 | 100 | 94 | 77 | 58 |
| 109 | 108 | 109 |  | 106 | 103 | 99 |
| 101 | 105 | 108 | 107 | 108 | 106 | 108 |
| 59 | 69 | 91 | 101 | 106 | 107 | 109 |
| 41 | 37 | 47 | 56 | 72 | 88 | 99 |

METHOD AND APPARATUS FOR IMAGE MATCHING

This application is the US national phase of international application PCT/GB02/04547 filed 4 Oct. 2002 which designated the U.S. and claims benefit of 0125774.0, dated 26 Oct. 2001, the entire content of which is hereby incorporated by reference.

TECHNICAL FIELD

The present invention relates to a method and apparatus for matching corresponding picture elements between two images, and to a method and apparatus for using the obtained matching information to generate a new third image.

BACKGROUND AND PRIOR ART TO THE INVENTION 3D perception is a very important aspect of human vision. While human beings can perceive 3D information effectively and effortlessly, it is still quite hard for a computer to extract a 3D model out of natural scenes automatically. Furthermore, whilst using 3D perception to imagine scenes from a slightly different angle is also effortless to a human being, the similar operation for a machine is fundamentally dependent upon the extraction of a suitable 3D model which the computer may then use to generate another image of the scene from the different angle.

The problem of the extraction of 3D structure information of scenes from images of the scene has previously been attempted to be solved by using various kinds of cues: stereo, motion, shading, focus/defocus, zoom, contours, texture, range data, and even X-ray. Among these, stereo vision has been studied most extensively mainly due to its effectiveness, applicability, and similarity to the human vision system.

FIG. 1 shows a typical stereo configuration. $IP_L$ ($IP_R$) is the image plane of the left (right) camera. $O_L$ ($O_R$), called optical centre, is the centre of the focus of the projection. The line $L_{OL}$ ($L_{OR}$), through $O_L$ ($O_R$) and perpendicular to the image plane $IP_L$ ($IP_R$), is named optical axis. The intersection of the optical axis $L_{OL}$ ($L_{OR}$) and image plane $IP_L$ ($IP_R$) is $O_L$ ($O_R$), which is called principle point or image centre. The distance between $O_L$ ($O_R$) and $O_L$ ($O_R$) is the focal length $f_L$ ($f_R$) of the left (right) camera. The line $L_e$ goes through both $O_L$ and $O_R$. The left (right) epipole $e_{RL}$ ($e_{LR}$) is the projection of $O_R$ ($O_L$) into the left (right) camera. For a 3D scene point P, its projection in the left (right) camera is $p_L$ ($p_R$). The plane determined by P, $O_L$, and $O_R$ is called the epipolar plane of P. The intersection $E_{pL}$ ($E_{pR}$) of this plane with $IP_L$ ($IP_R$) is named the epipolar line. It is easy to check that the epipolar line E.sub.pL ($E_{pR}$) must go through the epipole $e_{RL}$ ($e_{LR}$).

FIG. 2 shows a typical videoconferencing arrangement which embodies the stereo set-up of FIG. 1. A user is seated upon a chair at a table 20, directly facing a screen 22 which displays an image of the other video-conferees at the other end of a communications link. Disposed around the edge of the screen 22 are a plurality of cameras 24 facing the user, and arranged to capture images of the user. The images from any two or more of the cameras can be used as the stereo images required to extract 3D information.

Employing a converging stereo set-up as shown in FIG. 1 or 2, traditionally the problem of 3D structure reconstruction is solved by following three typical steps:

1. Stereo calibration: Calculating the stereo internal physical characteristics (the intrinsic parameters) and the 3D position and orientation (the extrinsic parameters) of the two cameras with respect to a world coordinate system or with respect to each other using some predefined objects (the passive calibration) or auto-detected features (the self-calibration);
2. Correspondence estimation: Determining for each pixel in each image the corresponding pixels in the other images of the scene which represent the same 3D scene point at the same point in time; and
3. 3D reconstruction: By triangulation, each 3D point can be recovered from its two projections into the left and right camera.

Out of these three steps the most challenging has proven to be the step of correspondence estimation. There are several main difficulties in obtaining correspondence estimation to a suitable accuracy:

1. Inherent ambiguity due to the 2D search within the whole image space;
2. Occlusions: Some parts of the 3D scene can not be seen by both cameras, and hence there will be no corresponding matching pixel in the other image;
3. Photometric distortion: The projection of a single 3D point into the two or more cameras appears with different image properties. An example of such a distortion is specular reflection of the scene light source into one of the cameras but not any of the others. In such a case the apparent intensity of light reflected from the 3D scene point would be much greater in the view which was suffering from specular reflections than in the other view(s), and hence matching of corresponding pixels between the images is made almost impossible; and
4. Projective distortion: The shape of the same 3D object changes between the stereo images e.g. A circular object will appear circular to a camera directly facing it, but elliptical to another camera at an oblique angle thereto.

Fortunately, the first difficulty of inherent ambiguity can be avoided to a certain degree by using the epipolar geometry, which means that, for a given pixel (e.g. $p_L$ in FIG. 1) its corresponding pixel (e.g. $p_R$) in another image must lie on the epipolar line (e.g. $E_{pR}$). The position of this epipolar line can be accurately computed, through using parameters about the camera set-up, e.g. by intersecting the epipolar plane (e.g. formed by $p_L$, $O_L$, and $O_R$) with another images plane (e.g. $IP_R$). Thus the 2D search is simplified to a 1D search problem. More conveniently, in the stereo set-up, it is possible to rectify the pair of stereo images so that the conjugate epipolar lines are collinear and parallel to the horizontal axis of the image plane, as described in A. Fusiello, E. Trucco and A. Verri. *A Compact Algorithm for Rectification of Stereo Pairs*. Machine Vision and Applications. 12. pp. 16-22. 2000. In this case, the two cameras share the same plane and the line connecting their optical centres is parallel to the horizontal axis. This stereo set-up is called parallel stereo set-up. After the rectification, the 2D correspondence problem is further simplified into a 1 D search along the epipolar line as a scanline. This searching process is commonly referred to as disparity estimation.

For solving the correspondence (or disparity) estimation problem, three issues should be addressed:

1. What kind of elements are used for matching;
2. What form of measurements should be employed;
3. How should the image searching process be performed.

Various kinds of matching elements have been used, including sparse image features, intensity block centred at a pixel, individual pixels, and phase information. The form of similarity measurements previously used depends largely on the matching elements used, for example, correlation is usually applied on block matching while distance between feature descriptors has been used for judging the feature similarity. With respect to the searching processes previously used, there have been two previous types. One is the performance of global optimisation, by minimising a certain cost function. The optimisation techniques employed include dynamic programming, graph cut, and radial basis function, etc. Another choice is the "winner-take-all" strategy within a given limited range. For a detailed discussion about classification of stereo matching, please refer to B. J. Lei, Emile A. Hendriks, and M. J. T. Reinders. *Reviewing Camera Calibration and Image Registration Techniques*. Technical report on "Camera Calibration" for MCCWS, Information and Communication Theory Group. Dec. 27, 1999.

In the stereo vision case, the correspondence estimation problem is usually called stereo matching. With the parallel stereo set-up using as described previously (whether obtained either by image rectification or the geometry of the image capture apparatus), the stereo matching is simplified into a 1D disparity estimation problem, as mentioned previously. That is, given a pair of stereo views $I_L(x,y)$ and $I_R(x,y)$ coming from a parallel set-up, the disparity estimation task aims at estimating two disparity maps $d_{LR}(x,y)$ and $d_{RL}(x,y)$ such that:

$$I_L(x,y)=I_R(x+d_{LR}(x,y),y) \quad \text{Eq. 1}$$

$$I_R(x,y)=I_L(x+d_{RL}(x,y),y) \quad \text{Eq. 2}$$

The nature of the disparity maps $d_{LR}(x,y)$ and $d_{RL}(x,y)$ will become more apparent by a consideration of FIGS. 3 and 4.

In order to provide ground-truth information to gauge the performance of both any prior art methods of disparity estimation and the method to be presented herein according to the present invention, we have created a pair of synthetic stereo images shown in FIGS. 3a and 3b by using ray tracing from real images. The synthetic 3D scene consists of one flat ground-plane, and three spheres located at different distances. Four real images are then mapped onto these four surfaces, the most apparent being that of the image of a baboon's face which is mapped onto the spherical surface in the foreground. In addition to using ray tracing to produce the synthetic stereo pair of FIGS. 3a and 3b, the ray tracing technique was also employed to produce a middle view as shown in FIG. 4(b), as well as a ground truth left to right disparity map as shown in FIG. 4a. The disparity map contains a respective displacement value d for each respective pixel in FIG. 3a (which represents the left stereo view) which when applied to the position (x,y) of a respective pixel gives the position (x+d,y) of its corresponding pixel in the right stereo view of FIG. 3b. That is, as will be apparent from the equations 1 and 2 given previously, the intensity value of each pixel in the disparity map gives the displacement required to get from a first pixel in the (left) view to the corresponding pixel in the (right) other view. In this respect, while a disparity map can be conveniently displayed as an image, and is done so in FIG. 4a, it can more rightly be considered as simply a matrix of displacement values, the matrix being the same size as the number of the pixels in each stereo image, such that the matrix contains a single one dimensional displacement value for each pixel in one of the stereo images.

Furthermore, it should also be noted that between any pair of stereo images two disparity maps are usually generated, a first map containing the displacement values in a first direction to obtain the displacements from the left to the right image, and a second map containing displacement values representing displacements in the opposite direction to provide pixel mappings from the right to the left images. In theory the respective values between a particular matched pair of pixels in the left and right images in each of the left to right and right to left disparity maps should be consistent, as will be apparent from equations 1 and 2.

In order to provide for a later comparison with the results of the present invention to be described, the disparity estimation results provided by two existing disparity estimation methods, being those of hierarchical correlation and pixel based dynamic programming will now be described. The results comprise a disparity estimation map together with a synthesised middle view using the matching information thus obtained for each algorithm, as respectively shown in FIGS. 5 and 6. More particularly, FIG. 5a shows the left to right disparity map generated by the hierarchical correlation algorithm, and FIG. 5b illustrates the synthesised middle view using the disparity information thus obtained. FIG. 6a illustrates the left to right disparity map obtained using the pixel based dynamic programming method, and FIG. 6b illustrates the synthesised middle view generated using the disparity information of FIG. 6a. In both cases it can be seen that problems exist in the region of the baboon's nose, in that incorrect correspondence estimation between respective pixels of the two stereo images which represent this feature has led to the anomalies in each disparity map, and hence the problems in the synthesised middle view images. The exact anomalies generated by the prior art algorithms when applied to the ground truth stereo image pair of FIG. 3 will become apparent by comparing FIGS. 5 and 6 respectively with the ground truth images of FIG. 4.

R. Szeliski. *Stereo algorithms and representations for image-based rendering* in British Machine Vision Conference (BMVC'99), volume 2, pages 314-328, Nottingham, England, September 1999 contains a very good review about other disparity estimation methods particularly used for image based rendering purposes, and further experimental comparisons are given in R. Szeliski and R. Zabih. *An experimental comparison of stereo algorithms*, Vision Algorithms 99 Workshop, Kerkyra, Greece, September 1999. Compared with feature, pixel, and frequency-based methods, it seems that a block matching approach combined with a "winner-take-all" strategy can be performed with sufficient quality of disparities in real time (see Changming Sun, *A Fast Stereo Matching Method*, Digital Image Computing: Techniques and Applications, Massey University, Auckland, New Zealand, 10-12 Dec. 1997), which is crucial for many applications such as teleconference systems. However, in order to obtain a better quality of results, there still exist two major difficulties:

1. Choosing an appropriate window size. The larger the window size, the more robust against noise and the smoother the disparity maps are, however some details will be lost, and also discontinuities may also be smoothed, vice verse. Essentially, the size of window should grasp the most important spatial scale of the images being dealt with. Various approaches have been attempted in the past to optimise the window size, with varying degrees of success, in particular see James J. Little, *Accurate Early Detection of Discontinuities*. Vision Interface 92, and T. Kanade and M. Okutomi. *A Stereo Matching Algorithm with an Adaptive Window: Theory and Experiments*. IEEE Transactions on Pattern Analysis and Machine Intelligence, Vol. PAMI-16. pp. 920-932. 1994.

2. Projective distortion: As mentioned previously, the perspective projection of the cameras generally makes the presence of a 3D object in the stereo pair different. Traditionally, within the disparity estimation art this issue was addressed by taking into account the slanted surface, which was tolerated by up-sampling the stereo images in advance (see P. A. Redert, C. J. Tsai, E. A. Hendriks, and A. K. Katsaggelos. *Disparity estimation with modeling of occlusion and object orientation*. Proceedings of the SPIE conference on Visual Communications and Image Processing (VCIP), volume 3309, pages 798-808, San Jose, Calif., USA, 1998) or non-linear diffusion (see Szeliski, R. and Hinton, G. E. *Solving random-dot stereograms using the heat equation*. Proceedings of the IEEE conference on Computer Vision and Pattern Recognition, San Francisco. 1986). However, projective distortion generally changes the appearance of a 3D object in the two stereo images (e.g. the curvature of texture on the surface of a sphere) with the result that most block-based methods fail to match corresponding pixels and features between images.

Traditionally, only one or the other of the above two issues have been previously addressed within existing correspondence estimation algorithms, and not both at the same time.

SUMMARY OF THE INVENTION

The present invention aims to address, at least partially, both of the above two problems simultaneously, as well as to provide a generally improved correspondence estimation method and apparatus which allows for the subsequent generation of higher quality synthesised images. Within the invention we use adaptive similarity curves as matching elements to tolerate both disparity discontinuities and projective distortion. In further embodiments a hierarchical disparity estimation technique is further incorporated and refined for improving both the quality and speed of the proposed algorithm. In addition, for video sequences, motion information may also be used to enhance the temporal continuity of the estimated disparity sequences.

In view of the above, from a first aspect according to the invention there is provided a method of matching picture elements between at least a first image and a second image each comprising a plurality of picture elements, the method comprising the steps of:

selecting a first picture element within the first image to be matched within the second image;

constructing a first sequence of picture elements within the first image and including the first picture element, wherein each picture element within the sequence possesses one or more characteristics most similar to the first picture element than other surrounding picture elements; and searching the picture elements of the second image using the constructed sequence as a matching element to find a substantially corresponding picture element within the second image to the first picture element.

By constructing a sequence of connected picture elements which possess one or more characteristics most similar to the picture element then a meaningful matching element for any particular picture element is derived. This overcomes the problems of having to choose an appropriate window size or shape for searching, as the provision of a sequence of related picture elements effectively provides a meaningful size and shape of matching element which characterises the various image features spatially distributed around the pixel to be mapped. Furthermore, the further use of such a meaningfully sized and shaped matching element means that the results of the search of the picture elements of the second image are usually much improved. Moreover, the use of an adaptive curve as a matching element also takes into account the projective distortion problem.

Preferably, the constructing step further comprises the steps of searching the picture elements of the first image in a first direction from the first picture element to determine a first line of up to h connected picture elements to form part of the first sequence; and searching the picture elements of the first elements in a second direction substantially opposite to the first direction to determine a second line of up to h connected picture elements to form part of the first sequence.

By searching in two opposite directions from the first picture element, it is ensured that a meaningful curve substantially centred on the first picture element to be searched is derived.

Preferably, each picture element within the sequence possesses the least difference in the intensity to the first picture element. Other characteristics other than intensity can be used to form the first sequence, such as chrominance when colour images are being matched.

Preferably, for any particular picture element to be searched in the second image, the searching step comprises:

determining a corresponding sequence of picture elements including the picture element to be searched to the first sequence of elements; and comparing the characteristics of the picture elements in the first sequence with the characteristics of the picture elements in the corresponding sequence to determine a cost value indicative of the degree of matching;

wherein a picture element in the second image is matched with the first picture element if its cost value indicates the highest degree of matching from the picture elements in the second image which have been searched.

The calculation of a cost value for each pixel element searched within the second image, and the matching of the picture element in the second image with the most appropriate cost value to the first picture element represents a "winner-take-all" strategy which has proven itself to be able to provide good quality correspondence estimation in real time. It is therefore particularly appropriate for video conferencing systems. Furthermore, the use of adaptive curves as matching elements as provided by the invention means that the cost value thus derived for each pixel in the second image is particularly accurate and meaningful.

Preferably, the characteristics of the picture elements in the respect of sequences which are compared include one or more of picture element intensity, mean value of intensity, and/or variance of intensity. Both intensity information such as absolute intensity and mean intensity, and edge information such as variance of intensity have proven to be useful and necessary in 3D vision perception of human beings. Therefore, by using the same characteristics in the present invention, it is thought that the correspondence estimation is improved.

In preferred embodiments, the searching step further includes the step of predicting a picture element in the second image at which to start searching based upon previous matches obtained for other picture elements.

By performing such a prediction as to the start of the search range within the second image, then the search times can be reduced, thereby rendering the present invention particularly applicable to video conferencing systems.

In the preferred embodiment, the predicting step further includes the step of selecting a picture element in a second image based upon a previous match obtained for another connected picture element to the first picture element. This has the advantage that a previous match obtained for an adjacent picture element to the first picture element provides information as to as possible appropriate match for the first picture element, thus further reducing search times.

Furthermore, preferably the predicting step further includes the step of selecting a picture element in the second image based upon a previous match obtained for another picture element which is a member of the first sequence.

Furthermore, preferably the predicting step also includes the step of selecting a picture element in the second image based upon a previous match obtained for another picture element, for which the first picture element is a member of the sequence constructed according to the constructing step for the other picture element.

Finally, the predicting step may also include the step of selecting a picture element in the second image based upon a previous match obtained for a corresponding picture element in a temporally displaced version of the first image to the first picture element. This latter step is of particular relevance to video conferencing, wherein a stream of images is provided to provide a moving picture.

In all of the above versions of the predicting step, computational complexity is reduced by constraining the search range to a meaningful starting pixel.

In other embodiments, the method further comprises generating a plurality of versions of each of the first and second images, each version of each image having a different resolution to the other versions of the same image, but with the same resolution as the corresponding version of the other image; and performing picture element matching in accordance with the present invention between each corresponding version of the first and second images; wherein picture element matching is performed between versions with a lower resolution prior to versions with a higher resolution.

In such a preferred embodiment, the first and second images are used to produce a hierarchical "pyramid" of images with the original images as the higher resolution images, proceeding down to lower resolution images. The pyramid may have as many levels as is required. In such a case, picture elements in the lower resolution images are matched prior to picture elements in the higher resolution images, and the matching obtained for the lower resolution images is then used as a spatial predictor to provide a search range in the higher resolution images.

Therefore, within the preferred embodiment the searching step further comprises the step of determining a search range of picture elements in the second image to be searched based upon previous matches obtained for corresponding picture elements in one or more of the lower resolution versions of the images.

The provision of such a search range for picture elements in the next higher resolution level up of the second image further reduces computational complexity by constraining the matching search to a meaningful range.

In other embodiments, the method of the invention further comprises the step of checking that the picture element in the second image found by the searching step meets one or more predetermined parameters with respect to the matching picture elements to other picture elements in the first image adjacent to or surrounding the first picture element, and discarding the match if the parameters are not met. Such a step has the advantage that continuity and ordering constraints of the estimated disparity found by the searching step are not violated, in that the matching pixel in the second image found for the first matching pixel is not considerably spatially distanced from a matching pixel in the second image to an adjacent pixel to the first picture element.

Furthermore, preferably when the searching step is unable to find a match for the first picture element, the method further comprises the steps of locating a matching previously made for another picture element in the first image for which the first picture element is a member of the sequence constructed for the other picture element according to the constructing steps; and matching the first picture element with a picture element in the second image which exhibits the same spatial displacement within the second image with respect to the position of the first picture element in the first image as the picture element within the second image matched to the other picture element in the first image exhibits with respect to the position of the other picture element. This has the advantage that for picture elements within the first image for which no disparity estimation has been found, the disparity values of pixels which are in the same sequence as the first picture element are propagated along the sequence to ensure that the first picture element obtains a meaningful value.

From a second aspect the present invention provides an apparatus for matching picture elements between at least a first image and a second image each comprising a plurality of picture elements, the apparatus comprising:

element selecting means for selecting a first picture element within the first image to be matched within the second image;

sequence construction means for constructing a first sequence of picture elements within the first image and including the first picture element, wherein each picture element within the sequence possesses one or more characteristics most similar to the first picture element than other surrounding picture elements; and image searching means for searching the picture elements of the second image using the constructed sequence as a matching element to find a substantially corresponding picture element within the second image to the first picture element.

Within the second aspect the present invention further includes the corresponding features and advantages as previously described with respect to the first aspect.

Furthermore, from a third aspect the present also provides a method of generating novel views of a scene, comprising the steps of:

receiving a first view of the scene as a first image comprising a plurality of picture elements;

receiving a second view of the scene as a second image different to the first image and comprising a plurality of picture elements;

performing picture element matching between the first and second images in accordance with the first aspect of the invention; and using the matching information thus obtained to synthesise a third image showing a third view of the scene.

Moreover from a fourth aspect according to the present invention there is also provided an apparatus for generating novel views of a scene, comprising:

view receiving means for receiving a first view of the scene as a first image comprising a plurality of picture elements, and for receiving a second view of the scene as a second image different to the first image and comprising a plurality of picture elements;

an apparatus according to the second aspect of the invention, and arranged to perform picture element matching between the first and second images; and image synthesis means arranged to use the matching information thus obtained to synthesise a third image showing a third view of the scene.

The present invention according to the third and fourth aspects provides the advantage that because the correspondence estimation is performed for the picture elements of the first image (and/or second image as required) using the method or apparatus according to the first or second aspects of the present invention, then a high quality disparity estimation map can be produced, which is then used to produce higher quality synthesised images than were previously available.

BRIEF DESCRIPTION OF THE DRAWINGS

Further features and advantages of the present invention will become apparent from the following description of a preferred embodiment thereof, presented by way of example only, and by reference to the accompanying drawings, wherein like reference numerals refer to like parts, and wherein:—

FIG. 13 is a matrix of picture element values illustrating how a sequence of picture elements is constructed within the first image according to a first method used in the invention;

FIG. 14 is a matrix of picture element values illustrating how a sequence of picture elements is constructed in the first image according to a second method used in the present invention;

DESCRIPTION OF THE PREFERRED EMBODIMENT

A preferred embodiment of the present invention will now be described with reference to FIGS. 7 to 21. The hardware and software elements required to provide the apparatus of the present invention will be described in detail first, followed by a detailed description of the operation of the hardware and software elements with respect to the method of the invention.

Figure 19:
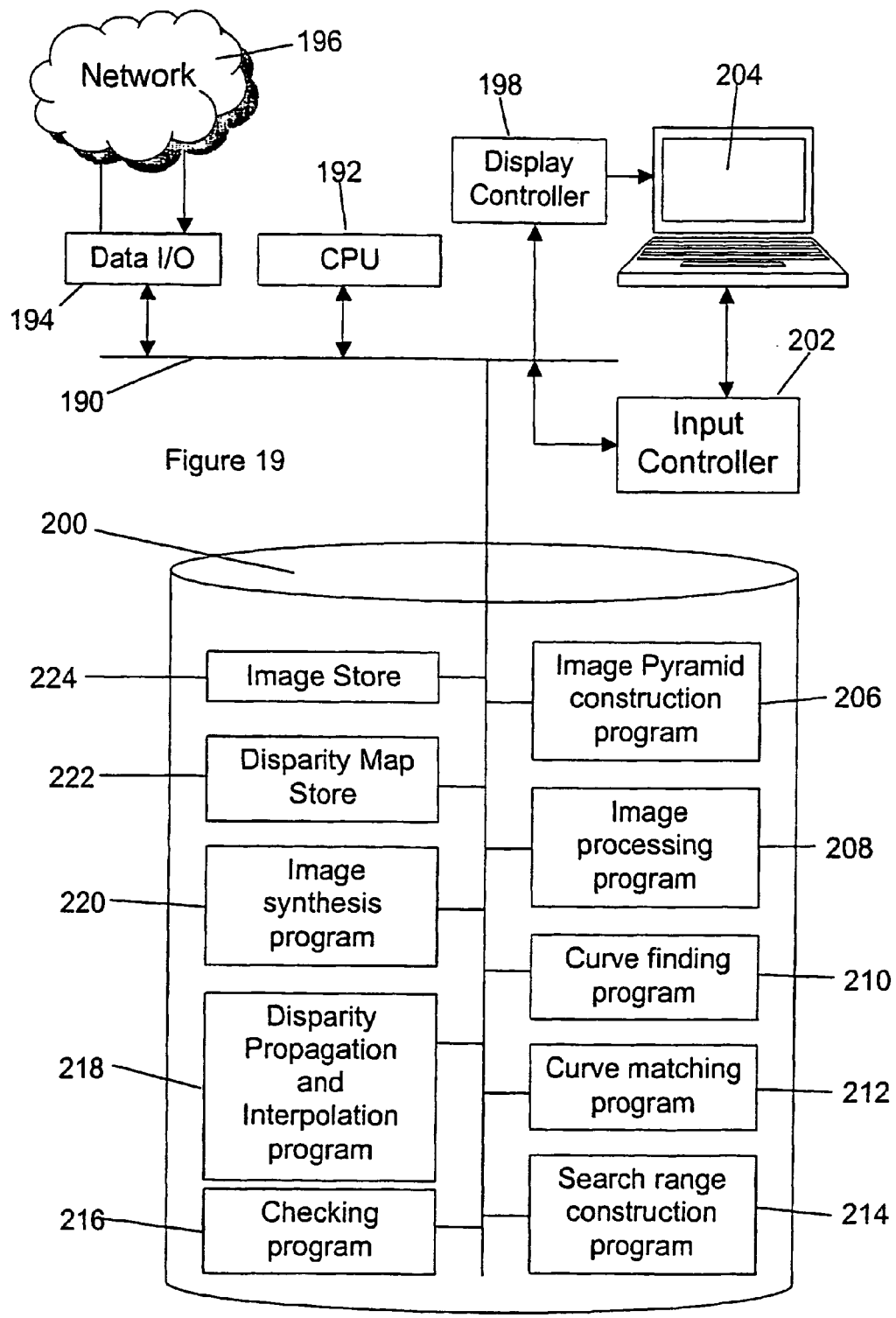
FIG. 19 is a block diagram illustrating the hardware and software elements of an apparatus according to the present invention.

FIG. 19 illustrates the hardware and software elements which are required to provide both the pixel matching apparatus and the novel image synthesise apparatus of the present invention. It should be noted that the invention is implemented on a standard computer, and hence whilst FIG. 19 illustrates the main elements thereof, the skilled man will understand that other elements and parts not shown or discussed below are required to render a computer operable.

With respect to the present invention, however, the apparatus of the present invention comprises a central processing unit 192, as is commonly known in the art.

The central processing unit 192 is arranged to receive data from and output data to a data bus 190. A data input and output (I/O) interface 194 is further provided which is arranged to provide connection into and from a network 196. The network 196 could be, for example, the Internet, or any other LAN or WAN. The data input and output interface 194 is similarly arranged to receive data from and transfer data to the data bus 190.

A user terminal 204 provided with a display and an input means in the form of a keyboard is provided to allow interaction of the apparatus with the user. An input controller 202 is arranged to control the keyboard and to receive inputs therefrom, the output of the input controller being sent to the data bus 190. Similarly a display controller 198 is arranged to control the display of the terminal 204 to cause images to be displayed thereon. The display controller 198 receives control data such as image data from the bus 190.

There is further provided a memory store 200 which is arranged to both store various software programs which are used to control the CPU 192, and also to provide data storage for images and other received or generated data. The memory store 200 may be implemented in either solid state random access memory, or via any other computer storage medium such as a magnetic disk, magneto-optical disk, optical disk, DVD RAM, or the like. The memory store is connected to the data bus 190 and is arranged to transfer data thereto and therefrom.

Stored within the memory store 200 is an image pyramid construction program 206, an image processing program 208, and a curve finding program 210. Furthermore, a curve matching program 212, a search range construction program 214, and a checking program 216 are also stored. Finally, an image synthesis program 220, and a disparity propagation and interpolation program 218 are also stored. All of the programs 206 to 220 are used to control the CPU to operate according to the present invention. The operation of the apparatus in accordance with instructions contained within the programs 206 to 220 will be described in detail later. Also provided within the memory store 200 is an image store 224, being an area of the memory store where image picture element information is stored, and a disparity map store 222 being an area of the memory store 200 where the image disparity information in the form of individual pixel matches is stored.

Having described the elements of the hardware and software which form the apparatus of the invention, the operation thereof in accordance with the method of the present invention will now be described. In particular, an overview of the operation of the present invention will be described next with respect to FIG. 7.

Figure 7:
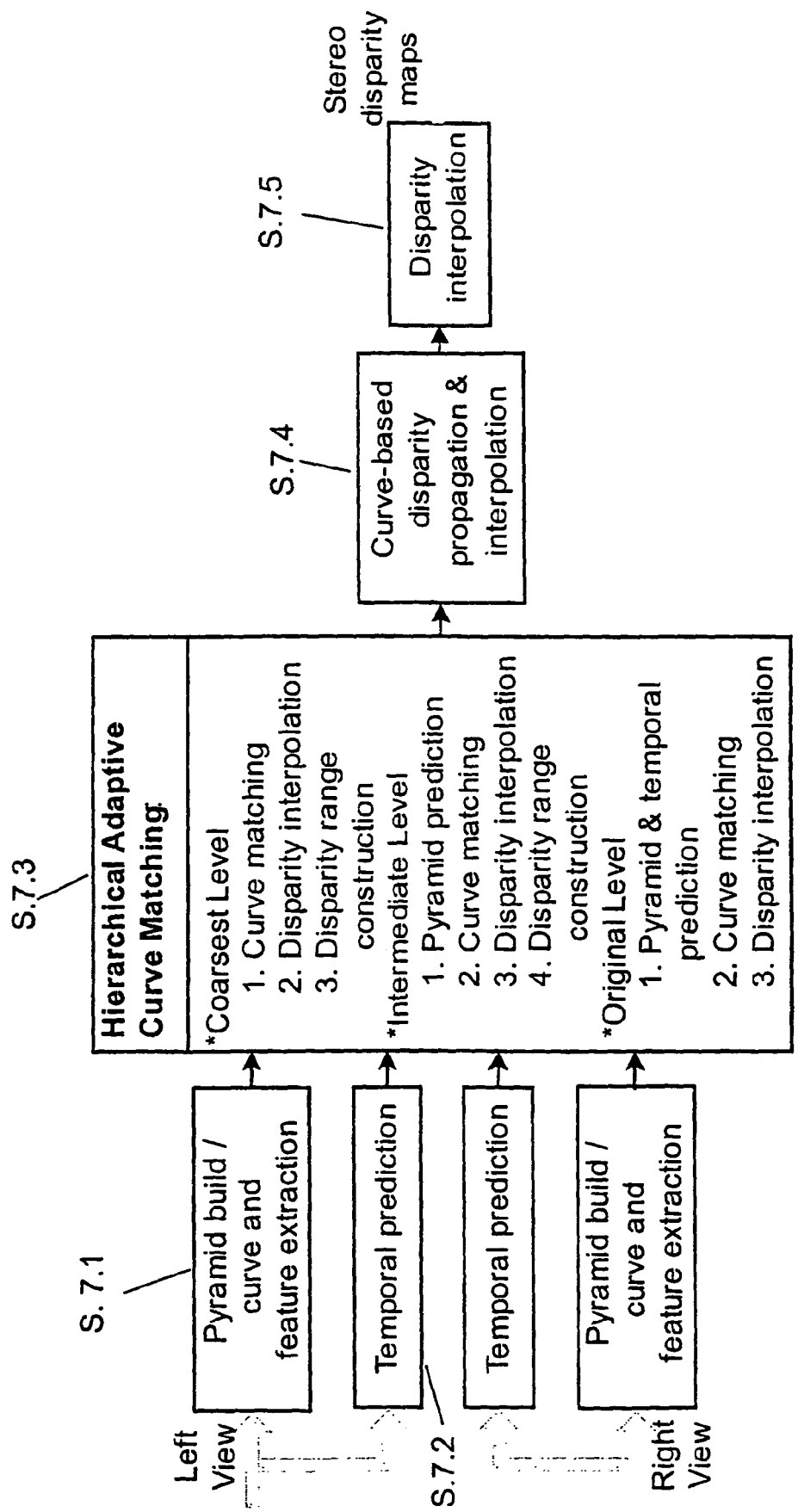
FIG. 7 is a first flow diagram illustrating the steps involved in the method and apparatus of the present invention.

The method of the present invention is an area based dense disparity estimation scheme. Instead of using a fixed sized window as a supporting area to aggregate matching costs, however, we employ a kind of adaptive curve that reflects the local curvature profile. FIG. 7 illustrates the whole process and is described in detail below. Note that both the left and right stereo images are processed identically and symmetrically, and hence only the processing of the left view is described in detail herein. It will be understood by the intended reader how the processing steps to be described can be symmetrically applied to the right view to obtain the required (i.e right-to-left) correspondence estimation output.

With respect to FIG. 7, we will be seeing that the first step in the process is that of step 7.1, wherein the left view image is subject to pyramid construction and feature extraction. This will be explained in detail later with respect to FIG. 8, but it refers to the hierarchical generation of different resolution images from the input left view image, and the establishment of adaptive sequences of pixels about each pixel within each version of each image which are then used as matching elements. With respect to the hierarchical construction of images, a plurality of versions of the left view image are created, each of a different resolution. The input image itself is the highest resolution, and a plurality of increasingly lower resolution images are generated by the pyramid construction program. Within each version of the image generated, feature extraction is performed for each pixel to generate an adaptive curve for each pixel of each image.

In parallel with step 7.1, at step 7.2 temporal prediction is performed between the present left view image and a previous left view image. The prediction data thus obtained is stored and is used in the adaptive curve matching processing step of step 7.3.

At step 7.3, hierarchical adaptive curve matching between the constructed sequences for each pixel is performed. Processing commences with the lowest resolution image, referred to in FIG. 7 as the coarsest level. Here, as will be seen, curve matching is performed to find matching pixels between the coarsest level of the left view and the coarsest level of the right view, and the specific details of the curve matching algorithm will be described later. Following curve matching disparity interpolation is performed as will also be described later. Finally, disparity range construction is then performed, the details of which will also be described later.

Following the processing of the coarsest level the curve matching process then proceeds to the next level resolution image up from the coarsest level, and the steps of pyramid prediction, curve matching, disparity interpolation, and disparity range construction are each performed. It should be noted here that at this intermediate level stage curve matching is performed between the respective versions of the left and right view which have the same resolution. The specific details of each of the pyramid prediction, curve matching, disparity interpolation, and disparity range construction steps will be described later.

Following the first intermediate level processing, further intermediate levels, being respective image versions of the left and right views with increasingly higher resolutions are respectively matched by applying the steps one to four of the intermediate level processing, as described. Therefore, the intermediate level steps one to four are performed in sequence for as many intermediate resolution versions of the left and right views as were generated during the pyramid construction steps.

Processing will finally precede to the last pair of images, which will be the left and right views at the original resolution. Here, pyramid and temporal prediction are performed, followed by curve matching, followed by disparity interpolation. The specific details of these steps will be described later.

The output of step 7.3 is both a left-to-right and a right-to-left disparity map which will give pixel matching between the input left and right views for those pixels for which matching were found. For those pixels for which no match was found, step 7.4 provides for disparity propagation and interpolation along the adaptive curves, which acts to fill in as many missing disparity values as possible. Finally, at step 7.5 any remaining gaps within the disparity maps are filled by interpolation. The output of the process of FIG. 7 are therefore two complete stereo disparity maps. The obtained disparity maps can then be used to generate novel images of a scene, as will be described later.

Having described an overview of the operation of the present invention, the detailed operation of each step will now be described with respect to FIG. 8.

Figure 9:
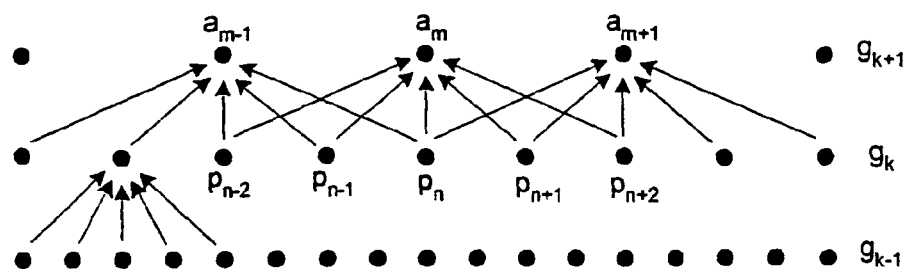
FIG. 9 illustrates the hierarchical construction of images used in the present invention.

Considering the left view first, at step 8.1 the image pyramid construction program 206 controls the CPU 192 to generate a sequence of reduced-resolution images from the original image I(x,y). This sequence is usually called an image pyramid. Here we use the method proposed by Peter J. Burt and Edward H. Adelson *The Laplacian Pyramid as a. Compact Image Code*. IEEE Transactions on Communication, vol. COM-31, pp. 532-540 (1983) to construct a Gaussian pyramid for each of the stereo views. For ease of illustration, FIG. 9 shows the construction of a such a Gaussian pyramid in a one-dimensional case. It should be readily apparent to the skilled man how this translates to a two-dimensional image, as follows.

Assuming the constructed pyramid from the image I(x,y) is $g_0, g_1, \ldots, g_n$ (Note: $g_0$ is the original (highest) level, and $g_n$ is the coarsest (lowest) level), then:

$$g_0(x,y) = I(x,y)$$

$$\text{DIMENSION}(g_0) = \text{DIMENSION}(I)$$

$$g_k(x, y) = \sum_{m=-2}^{2} \sum_{n=-2}^{2} W(m, n) \cdot g_{k-1}(2x + m, 2y + n)$$

$$\text{DIMENSION}(g_k) = \text{DIMENSION}(g_{k-1})/2 \, (0 < k \leq n)$$

where W(m,n) is the pyramid filtering kernel, and, according to discussion in Burt et al. has several properties as follows (notice that here we only consider a 5×5 filter):

| | |
|---|---|
| $W(m, n) = w(m)w(n)$<br>$w(-m) = w(m)$ | Separability<br>Symmetry |
| $\sum_{m=-2}^{2} w(m) = 1$ | Normalized |
| $w(0) + 2\sum_{m \text{ is even}} w(m) = 2\sum_{m \text{ is odd}} w(m)$ | Equal Contribution |

And, from analysis by Burt et al., it was found that w(0)=0.4 gives the best approximation to a Gaussian filter. Thus, the pyramid filter we employed here is:

$$W = \begin{bmatrix} 0.05 \\ 0.25 \\ 0.4 \\ 0.25 \\ 0.05 \end{bmatrix} [0.05 \quad 0.25 \quad 0.4 \quad 0.25 \quad 0.05]$$

By using such a 5×5 filter it will be seen that each level of the image pyramid has one-twenty-fifth as much information as the next level down, as 25 pixels are effectively combined into a single pixel. The size of the filter and the resolution desired in the coarsest level therefore determines how many levels there will be in the image pyramid for an input image of any particular size. It is quite possible for there to be more than one intermediate resolution image between the original image and coarsest image in the pyramid.

Following the image pyramid construction, at step 8.3 the image processing program controls the CPU to perform an image mean and variance calculation on the pixels in the image. This is because both intensity information and edge information have proven to be useful and necessary in 3D vision perception of human beings. Therefore within the present invention three types of information are employed:
1. Pixel Intensity I(x,y)—Original intensity info;
2. Mean of Intensity M(x,y)—Intensity info tolerating noise; and
3. Variance of Intensity V(x,y)—Gradient-like feature reflecting presence of edges.

The three individual sets of information are then combined within a local cost function, which increases the robustness of the present invention at performing matching. The three sets of information are obtained as follows.

Figure 11:
FIGS. 11(a)-(d) respectively show: (a) original image; (b) intensity mean map; (c) standard variance map; (d) modified variance map of the image of (a)

For each pixel (x,y) in the current image, its mean and variance values are computed within a small horizontal segment, of w-pixel (w is set to 7 by default), centred on that pixel. This process gives rise to a mean map M(x,y) and a variance map V(x,y) of the same size as the intensity image I(x,y). FIG. 11 shows such an example.

FIG. 11(A) is the left image of the 'Head' stereo pair (from the Multiview Image Database, University of Tsukuba) which is commonly used to test disparity estimation algorithms. FIG. 11(B) is its mean map and FIG. 11(C) is the variance map. For easy visualisation, the variance maps have been translated and scaled to the range [0, 255].

Figure 12:
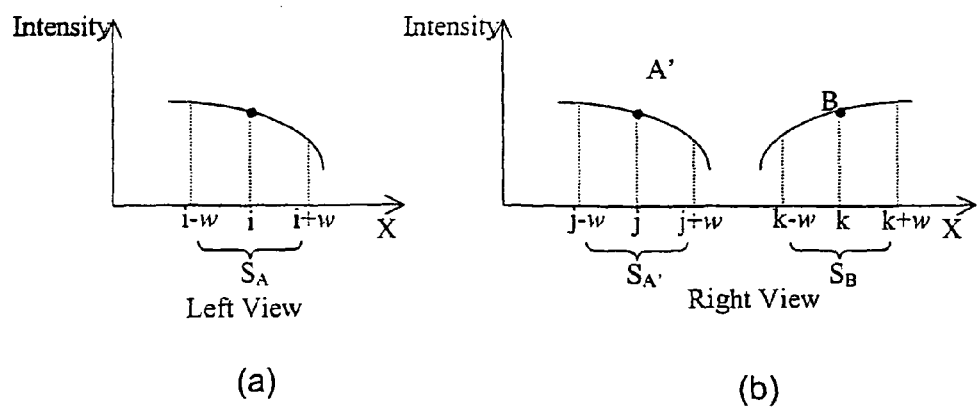
FIG. 12 illustrates how the same variance can be misinterpreted between the stereo pairs of images.

However, by using the traditionally defined variance, we are not able to tell the difference between the two kinds of intensity profiles around A' and B, as will be apparent from FIG. 12. Here, A in the left view corresponds to A' in the right view. However, as the intensity profile for the calculation segment $S_B$ of pixel B is symmetric with that of the calculation segment $S_{A'}$ of pixel A, by matching based on the combined cost information proposed above, A will possibly be matched to B instead of A'. To differentiate A' from B, we adopt a modified version of standard variance. After a variance value is calculated for a pixel based on the horizontal segment centred on it, if the sum of intensity of all the pixels on the right half of that segment is smaller than that of all pixels on the left half of that segment, then the variance value is multiplied by −1. FIG. 11(D) shows the modified variance map for the example "Head" left image.

Following the mean and variance calculation, at step 8.4 curve finding is undertaken by the CPU under the control of the curve finding program 210, to find for each pixel in the image being processed a sequence of connected pixels which can then be used as a matching element for that particular pixel. Curve finding is normally realised in two steps, namely 1) similar pixel finding and 2) curve construction, as described next. Furthermore for the similar pixel finding step 1) two variations 1a) or 1b) are possible. For the lower resolution images, steps 1a) and 2) are used, while for the original resolution image steps 1b) and 2) are used, as follows:

1a) Similar pixel finding (lower resolution image): For each pixel (x,y), the three neighbouring pixels above the pixel, if they exist, are examined, and the pixel (m,y−1):m∈{x−1,x,x+1} having the smallest intensity difference is defined as its "Above similar pixel". Similarly, the three neighbouring pixels below (x,y), if they exist, are also examined, and the pixel (m,y+1):m∈{x−1,x,x+1} having the smallest intensity difference is defined as its "Below similar pixel".

1b) Similar pixel finding (original image): For each pixel (x,y), assume the pixel (m,n) is the 'Above similar pixel' to (x,y) found so far based on 1a) (that is, perform 1a) to find the above similar pixel). A sanity check is then carried out, as follows. The found "Above similar pixel" is a valid "Above similar pixel" if and only if its intensity value satisfies another constraint:

$$|I(x,y)-I(m,n)| \leq \min(|I(x,y)-I(x-1,y)|, |I(x,y)-I(x+1,y)|)$$

Otherwise, we say that the pixel (x,y) does not have an 'Above similar pixel'. The same process applies to finding the "Below similar pixel" of the pixel (x,y).

We have observed that this constraint, on the one hand, increases the accuracy and robustness of the disparity estimation followed, while, on the other hand, reduces slightly the discriminating power of the local matching cost function. This is why we only perform it on the original resolution image.

2) Curve construction: For each pixel (x,y), find its "Above similar pixel" at (*,y−1), for which pixel, the process in 1 a) or 1b) is repeated until we have h (h is set to 3 by default) successive pixels above (x,y) or we encounter a pixel which does not have any "Above similar pixel" at all. The same process is repeated for finding successive "Below similar pixel". This chain of found pixels (which may be equal to or less than 2h+1 in length) including the pixel (x,y) itself comprises a local curve representation or pixel (x,y).

It should be noted that curve finding is performed for each pixel in the image, and data indicative of the connected sequences of pixels thus found is stored in the memory store for each pixel in the image. This data is further arranged to be searchable such that it is also possible to tell if any particular pixel in the image is a member of the curve found for any other pixel in the image.

As an example, assume we want to find the curve of the pixel (308, 141) in the left image of the "Head" stereo pair (shown in FIG. 11A). The curve searched with 1 a) and 2) is shown in FIG. 13 while that searched using 1 b) and 2) is shown in FIG. 14. It will be seen that the sanity check of search step 1b) as described has resulted in a shorter curve being found in FIG. 14 than in FIG. 13.

Following curve finding, at step 8.5 the curve matching program 212 controls the CPU to perform curve matching between the found curves for each pixel, and the pixels in the right image. This is performed as follows.

In step 8.1, we constructed a pyramid for each view of the stereo pair. At the same time, low-level but dense features such as intensity mean and variance were extracted for each pixel within a horizontal segment, at step 8.3. Solely based on the intensity information, an adaptive curve structure was established also per pixel in the vertical direction, at step 8.4. By utilising the dense features as measuring a cost function, the curve information as an aggregation area, and the pyramid as providing guidance in the scale space, matching is performed in accordance with the following.

For any particular pixel in the left image to be matched it is first necessary to determine a starting pixel in the right image for which the degree of matching is to be evaluated, as well as a search range. The degree of matching of the starting pixel in the right image to the pixel to be matched in the left image is then evaluated by calculating a cost value for the starting pixel, which is then stored. Processing then proceeds along the scan-line (it will be re-called here from the prior art that image rectification can be performed to reduce the search problem to a search along a 1D scan line) to the next pixel in the range, and a cost value is calculated for that pixel. This process is then repeated for every pixel in the search range, until a cost value is obtained for each. The pixel in the right image with the lowest cost value is then chosen as the matching image to the pixel to be matched within the left image, subject to it passing a number of validity checks described later. The evaluation of the cost function, the choice of starting pixel, and the determination of the search range are discussed below.

The local matching cost function employed for measuring the similarity (or alternatively the dissimilarity) between a pixel (x,y) of a curve representation A(x,y) in the left view image I and its matching candidate pixel (x+d,y) that has a horizontal disparity d and a curve representation A'(x+d,y) in the right view image I' is:

$$C(x, y, d) = \frac{1}{S_{A(x,y)}} \cdot \sum_{(m,n) \in A(x,y)} \frac{(I_A(m,n) - I'_{A'}(m',n))^2 + (M_A(m,n) - M'_{A'}(m',n))^2 + (V_A(m,n) - V'_{A'}(m',n))^2}{|I_A(m,n) \cdot I'_{A'}(m',n)|}$$

where A(x,y) serves as the aggregation (support) segment for the pixel (x,y); $S_{A(x,y)}$ is the length of the segment. Note that for clarity we have used A and A' to denote, respectively, the two corresponding curve representations A(x,y) and A'(x+d, y). In the right view image I' a pixel's horizontal axis m' assumes the index along the curve A' while its vertical axis position is n.

In this cost function we have incorporated the impact of all the three feature representations of corresponding pixels—the original intensity (I,I'), the mean (M,M') and the modified variance (V,V') based on short horizontal segments. The denominator in the cost function is used to remove the possible scale difference existed between the left and right view images.

Note that in the highest level, as each pixel has a curve with a different length, the aggregation segment should have the minimal length of the compared two curves.

In order to match a pixel (x,y) in the left image, the above function is applied to each pixel (x+d,y) in the search range in the right image in turn, and a single cost value is obtained for each. The pixel (x+d,y) with the lowest cost value from the range is then subject to a continuity and ordering checking process (described later), and is selected as the matching pixel to the pixel (x,y) if it meets the continuity and ordering requirements. If selected as a valid matching pixel the displacement (disparity) value d is stored at position (x,y) in the left-to-right disparity map. If the pixel does not meet the continuity and ordering constraints then no valid match is considered to have been found, and no entry is made in disparity map. The matching process is repeated for every pixel in the left image, with the result that a substantially complete left-to-right disparity map is obtained, except for those pixels for which no valid match with respect to the ordering and continuity constraints could be found.

It should further be noted that in order to cope with the visibility problem (two different points are mapped to the same pixel position) which may appear in a 3D scene, for the right image, our matching process proceeds along the epipolar line (scanline) from left to right within the search range, while for the left image it proceeds from right to left.

With respect to the choice of starting pixel for each search, spatial disparity prediction can be used based on previously made matches. That is, when proceeding to compute the disparity map for a pair of images from top to bottom on a pixel by pixel basis, the disparities already obtained offer reasonably good predictions on the disparity for the current pixel. These include:

a) Horizontal predictor (only one)—The disparity of the immediately preceding pixel (in a top-to-bottom left-to-right raster processing scan this will be the pixel to the present pixel's immediate left);

b) Intra-curve predictor (maximum of one)—The disparity of the "Above similar pixel", as found by the curve finding program;

c) Inter-curve predictor (none or more)—The disparities from the pixels whose disparities were already calculated and whose curves go through the current pixel. On average, the number of this kind of predictors is h (half size of the curve).

d) Temporal predictor (only one)—The disparity of the motion-compensated corresponding pixel in the previous frame. This is discussed in further detail later.

Figure 10:
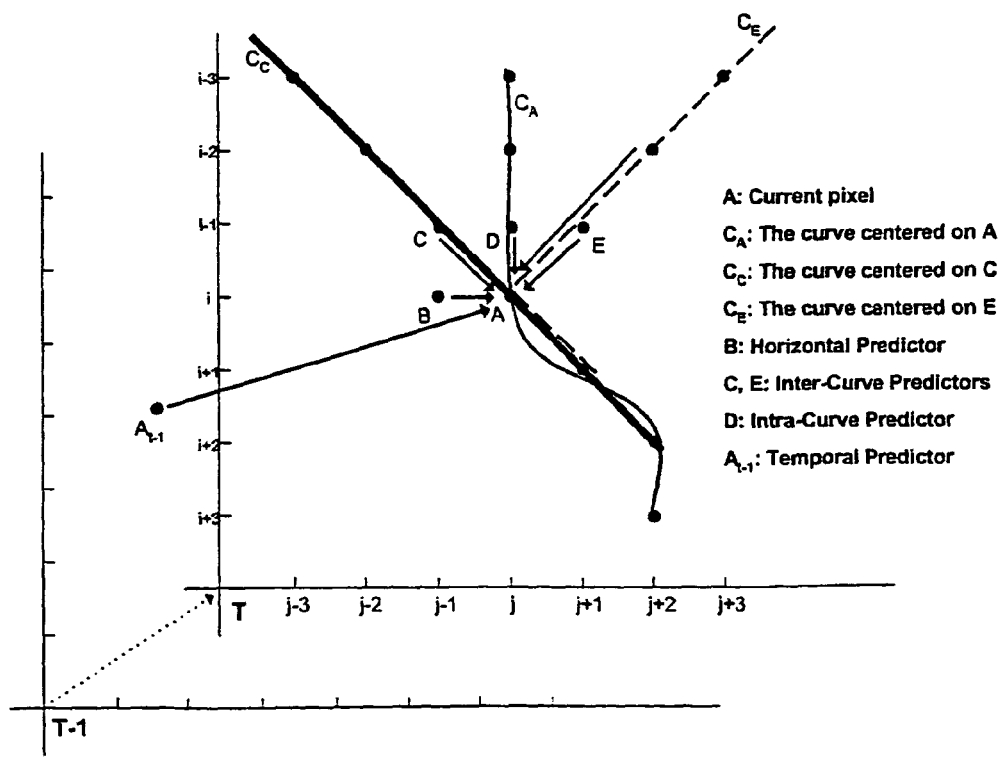
FIG. 10 is a graph illustrating how a search starting point can be predicted in the present invention.

An example is shown in FIG. 10, assuming three curves intersect at pixel A. In this case a horizontal disparity prediction is obtained from pixel B, an intra-curve prediction from pixel D, an inter-curve prediction from pixel from pixel C, another inter-curve prediction from pixel E, and a temporal prediction from pixel A(t–1). The actual prediction value obtained from each prediction is the disparity value d previously calculated for pixels B, C, D, E, or A(t–1) respectively.

With each disparity predictor, there is an associated local matching cost, calculated in accordance with the local cost function described above. The one prediction, among the four kinds of predictors and possible more than four predictions (five in the example above), whose corresponding matching cost is the smallest, is chosen as the starting point for the search. That is, the disparity value d from the prediction with the lowest calculated cost value is selected as the starting point, and the pixel (x+d,y) in the right image is searched first. The search for the current pixel disparity then proceeds with this starting point together with a search range. The search range is preferably given by the user (for lowest level) or constructed from the disparity map of the lower level. The search range construction process will be discussed later with respect to step 8.9.

It is mentioned above that temporal prediction is used by the curve matching program 212, and this is performed as follows.

For a pair of stereo sequences, there is not only stereo correspondence between the two stereo images at each frame, there is also motion correspondence between two consecutive frames within one sequence. Therefore, for stereo sequences, we get another type of information, motion, to use.

Figure 17:
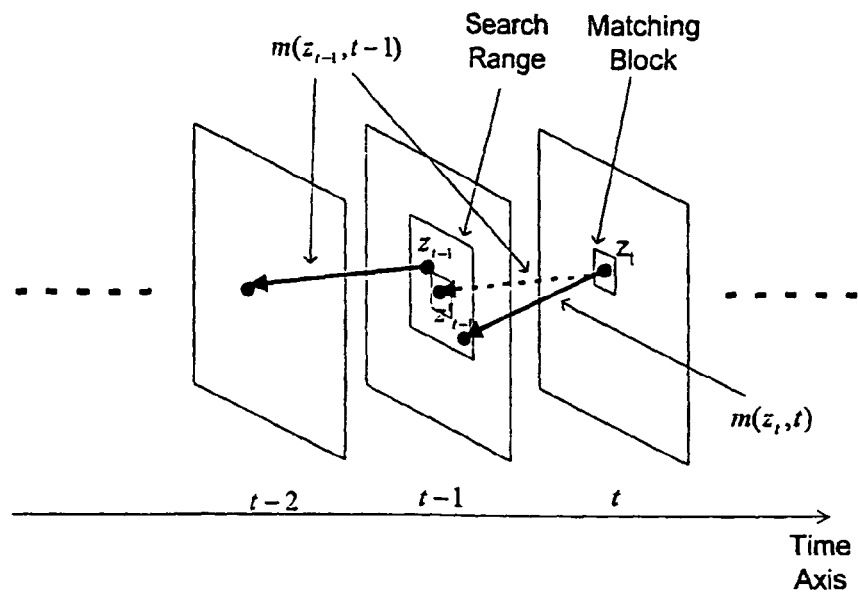
FIG. 17 is a schematic illustrating a temporal matching method used in the present invention.
Figure 18:
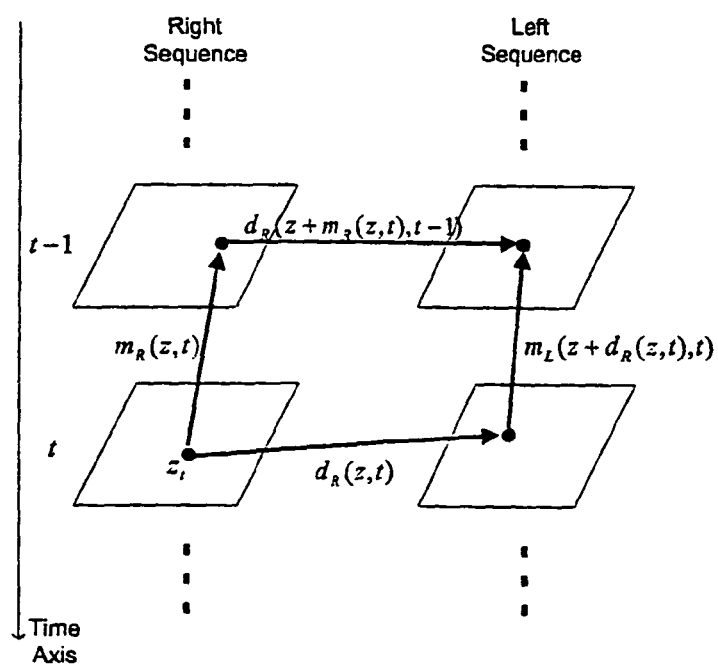
FIG. 18 is another schematic diagram illustrating a temporal matching method used in the present invention.

At step 8.2, motion estimation is done for the left and right sequence independently. FIG. 17 shows schematically the idea of motion estimation process.

At time t, the whole frame is divided into equal sized non-overlapping rectangular 8×8 blocks. The central pixel of each block is chosen as representative of the whole block. For a representative pixel $z_t$ in the frame at time t of the sequence, the motion vector $m(z_{t-1}, t-1)$ of the same position pixel $z_{t-1}$ in the frame at time t−1 is used to locate a position $z'_{t-1}$ (see FIG. 17). Then a search window S (sized 16×16) is placed around the pixel $z'_{t-1}$ in frame t−1. After that, a block matching technique is used to search for a good match within the search window S in the frame t−1 for the block centred at $z_t$ in frame at time t, as described in Fang-hsuan Cheng and San-Nan Sun *New Fast and Efficient Two-Step Search Algorithm for Block Motion Estimation* IEEE Transactions on Circuits and Systems for Video Technology. Vol. 9. No. 7. pp. 977-983. October, 1999. The matching criterion employed is MAD (Mean Absolute Difference). However, instead of searching sub-optimally like the three-step search, we use exhaustive search employing the successive elimination algorithm proposed in W. Li and E. Salari, *Successive Elimination Algorithm for Motion Estimation*, IEEE Transactions on Image Processing, Vol. 4, No. 1, January 1995, pp. 105-107. Once the motion vector $m(z_t, t)$ is found, it is assigned to all pixels in the block centred at $z_t$. This process is then repeated for all blocks of the frame t.

Following motion estimation, at step 8.7 the temporal prediction is generated, as follows.

To maintain the temporal continuity of the estimated disparity field, the disparity temporal constraint equation should be considered. Let $d(z,t)$ denote the disparity vector of pixel z at time t, and $m(z_t,t)$ denote the motion vector from position z at time t to the position of the same pixel at time t−1. Then the disparity temporal constraint can be written down as (see FIG. 18):

$$d_R(z,t) + m_L(z + d_R(z,t), t) - m_R(z,t) - d_R(z + m_R(z,t), t-1) = 0$$

However, the above equation is too complex to be employed in practice. Instead of sticking to it strictly, we choose $$d_R(z,t) = d_R(z + m_R(z,t), t-1)$$

as the temporal prediction for the current search. This is then used as the temporal prediction value, as previously described.

The continuity and ordering checks mentioned above which are used to check whether a valid match has been found will now be described in more detail with respect to FIGS. 15 and 16.

Within the present invention a check is made to ensure that the continuity and ordering constraints (continuity and ordering requirements for disparity values are described in H. Ishikawa and D. Geiger *Occlusions, Discontinuities, and Epipolar Lines in Stereo*. Fifth European Conference in Computer Vision (ECCV'98), 1998) of the found disparities are met in the matching process. Normally, if the disparity is continuous, the presently considered pixel should have the same (or a very similar) disparity value as the predicted starting point. If it is larger than the starting point by a certain margin, however, then the continuity constraint is likely to be violated. On the other hand, if it is smaller than the starting point by a certain margin then both the continuity and the ordering constraints are likely to be violated. In order to take the constraints into account, within the present invention two ratios for the continuity and ordering constraints are respectively combined with the cost produced by the disparity value to ensure the two constraints are met. The searching process based on this consideration is shown most clearly by the following pseudo-code:

---

Input:
➤ $R_c$: The ratio of disparity continuity. $0 \leq R_c \leq 1$.
➤ $R_o$: The ratio of ordering constraint. $0 \leq R_o \leq 1$.
➤ (x,y): Current pixel position.
➤ $[d_{min}, d_{max}]$: The disparity search range for the current pixel.
➤ $d_0$: Starting point for the current pixel.
Output:
    Best disparity value $d_{best}$ for current pixel and the corresponding cost $C_{best}$.
Disparity search process:
    $d_{best} = d_0$ and $C_{best} = C(x,y,d_0)$;
    /* First check to see if the start point from the predictors is less than the search range */
    If $d_0 < d_{min}$ Then /* see (a) in Figure 15*/
        For d from $d_{min}$ to $d_{max}$ do
            /* Continuity constraint may be violated, so ... */
            If $C(x,y,d) < (1-R_c) \cdot C_{best}$ Then
                $d_{best} = d$ and $C_{best} = C(x,y,d)$.
            Endif
        Endfor
    Endif
    /* Next check to see if the start point from the predictors is greater than the search range */
    If $d_0 > d_{max}$ Then /* see (b) in Figure 15*/
        For d from $d_{max}$ to $d_{min}$ do
            /* Both continuity and ordering constraints may be violated, so ... */
            If $C(x,y,d) < (1-R_c) \cdot (1-R_o) \cdot C_{best}$ Then
                $d_{best} = d$ and $C_{best} = C(x,y,d)$.
            Endif
        Endfor
    Endif
    /* Finally check if the start point from the predictors is within the search range */
    If $d_0 \leq d_{max}$ and $d_0 \geq d_{min}$ Then /* see (c) in Figure 15*/
        For d from $d_0$ to $d_{max}$ do
            /* Continuity constraint may be violated, so ... */
            If $C(x,y,d) < (1-R_c) \cdot C_{best}$ Then
                $d_{best} = d$ and $C_{best} = C(x,y,d)$.
            Endif
        Endfor
        For d from $d_0$ to $d_{min}$ do
            /* Both continuity and ordering constraints may be violated, so ... */
            If $C(x,y,d) < (1-R_c) \cdot (1-R_o) \cdot C_{best}$ Then
                $d_{best} = d$ and $C_{best} = C(x,y,d)$.
            Endif
        Endfor
    Endif

---

In the above pseudo code, the larger the value of $R_C$, the smoother the disparity maps are, and vice versa. The larger the value of $R_O$, the lower possibility the ordering constraint is violated, vice verse.

Figure 15:
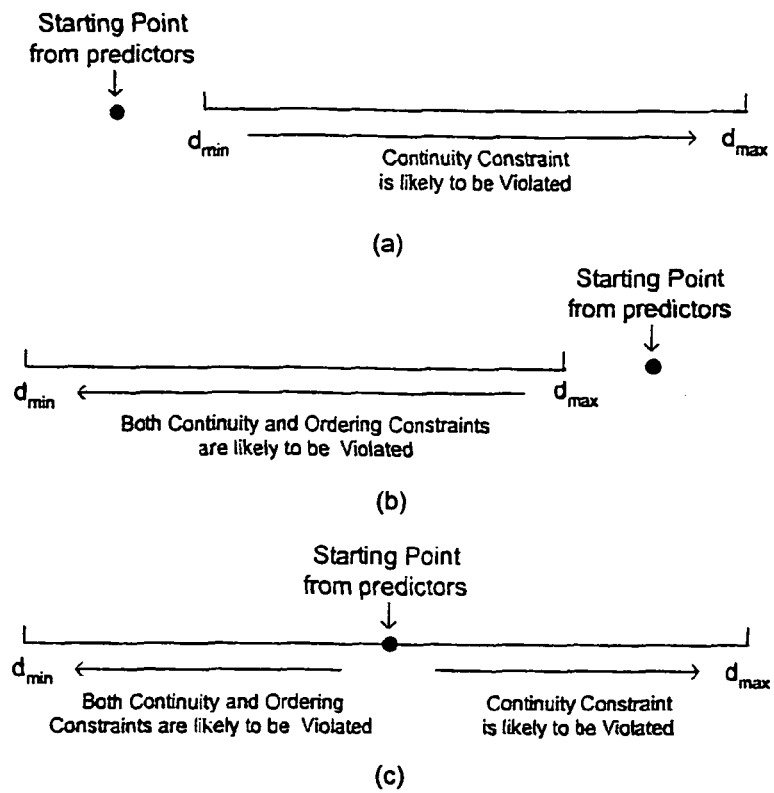
FIG. 15 is a graphical representation of a checking method used within the present invention.
Figure 16:
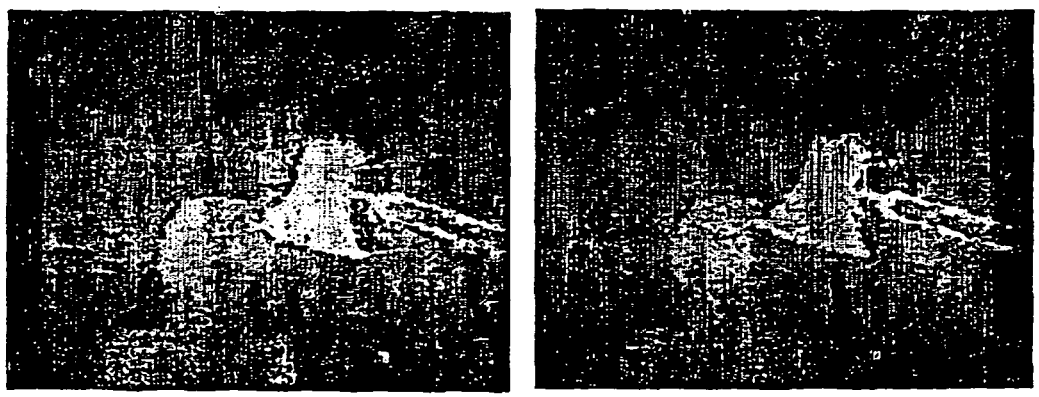
FIG. 16(a) is a left to right disparity map which has been subjected to the checking method of FIG. 15.
FIG. 16(b) is a right to left disparity map which has been subjected to the check in method of FIG. 15.

The continuity and ordering constraints tested by the above procedure are graphically illustrated in FIG. 15. In FIG. 15(a) the starting point from the predictors has given a starting point less than the search range, and hence as searching proceeds along the range from $d_{min}$ to $d_{max}$ there is a possibility that the disparity continuity constraint may be violated. To counter this possibility, the calculated cost value for each searched pixel in the range is compared with a function of the continuity ratio, as shown in the first part of the pseudo-code.

In FIG. 15(b), the starting point from the predictors has given a starting point greater than the search range, and hence as searching proceeds along the range from $d_{min}$ to $d_{max}$ there is a possibility that both the disparity ordering constraint and the disparity continuity may be violated. To counter this possibility, the calculated cost value for each searched pixel in the range is compared with a function of both the continuity ratio and the ordering ratio, as shown in the second part of the pseudo-code.

In FIG. 15(c), the starting point from the predictors has given a starting point within the search range, and hence as searching proceeds along the range from $d_{min}$ to $d_{max}$ there is a possibility that both the disparity ordering constraint and the disparity continuity may be violated in the first region from $d_{min}$ to the starting point, or that the continuity constraint may be violated in the second region from the starting point to $d_{max}$. To counter this possibility, the calculated cost value for each searched pixel in the range is compared with a function of both the continuity ratio and the ordering ratio within the first region, and with a function of just the continuity ratio in the second region, as shown in the third part of the pseudo-code.

As discussed previously, if a disparity does not meet the continuity and ordering constraints as tested by the above procedure, then the found disparity value is discarded, and no entry is made in the disparity map for the pixel (x,y) presently being matched.

The output of the curve matching step 8.5 is a disparity map showing the (for the left image) left-to-right disparity values for each pixel in the left image to match with their corresponding matching pixels in the right image. The values thus obtained are then subject to another check as follows.

As mentioned previously a disparity value found for a pixel in the left image should also apply equally to a matching pixel in the right image. That is, if pixel (x,y) in the left image is matched with pixel (x+d,y) in the right image, then correspondingly when finding a match for pixel (x,y) in the right image pixel (x−d,y) in the left image should be the matching pixel. This symmetrical property of matching from left-to-right and right-to-left is used within the present invention as another check as to whether a pixel found by the curve matching program 212 is in fact the correct pixel. Therefore, at step 8.11 the checking program 216 performs a left-right inter-view matching co-operation check on the found disparity value as follows.

For a current pixel α in the left view image the matching process program 212 gives rise to a disparity value $d_\alpha$ and the associated cost $c_\alpha$. Assuming its corresponding pixel in the right view image is α' and it has a currently assigned disparity $d_{\alpha'}$ and associated cost $c_{\alpha'}$. If $c_{\alpha'}$ is larger than $c_\alpha$, then $c_{\alpha'}$ and $d_{\alpha'}$ for the pixel α' will be replaced by $c_\alpha$ and $d_\alpha$ respectively. In doing this, the left-right view consistency can be enhanced, thus improving the quality of the final disparity maps.

The left-right consistency check is the final step performed in the curve matching procedure, and the output of the curve matching step is a substantially complete disparity map, but with some holes due to the ordering and continuity constraint checks. Example disparity maps output by the curve matching step are shown in FIG. 16. Here, FIG. 16(a) shows the left to right disparity map for the 'Head' image pair (source: University of Tsukuba) mentioned previously, while FIG. 16(b) shows the corresponding right-to-left disparity map. From FIG. 16 it will be seen that a disparity value has been obtained for almost every pixel in each image, but that some pixels have had no disparity value assigned (no disparity value is represented by a black hole in the disparity map), because the found matching pixel would not have met the continuity and ordering constraints. Further processing must therefore be applied to fill in the missing disparity values, and this is described later with respect to steps 8.8, 8.12, and 8.14. For the time being, however, following curve matching processing proceeds to step 8.6.

At step 8.6 an evaluation is made as to whether the image just processed is the highest resolution image (i.e. the original image) or whether one of the lower resolution images in the image pyramid has just been processed. If the original image has just been processed then processing proceeds to step 8.13, whereas if a lower resolution image (i.e. the coarsest image or an intermediate image) in the pyramid has just been processed then processing proceeds to step 8.8. It should be recalled here that the matching process is performed hierarchically on pairs of images from the left and right view at each level of each image's respective image pyramid. That is, the steps 8.3, 8.4, 8.5 and 8.11 are each performed in order to match pixels between the coarsest resolution images, between the intermediate resolution images, and between the original images respectively.

Assuming for the present discussion that the coarsest image (or an intermediate image) has just been processed, then processing proceeds to step 8.8 wherein the disparity propagation and interpolation program 218 performs disparity interpolation to provide disparity values d for those pixels for which no matches were found by the curve matching program (i.e. for those black pixels in FIG. 16(a) and (b)). The disparity interpolation is performed simply by linear interpolation along scanlines, such that a pixel will take as its disparity value the mid-point between the disparity values found for pixels on either side horizontally to it.

Following step 8.8, at step 8.9 the search range construction program 214 acts to determine the search range to be used in curve matching searches for the next resolution upwards images. This is performed as follows.

In this hierarchical matching strategy, for the disparity search at the lowest level, the user defines a search range $[d_{min}, d_{max}]$. For other levels, however, within the present invention we use the disparity obtained at the lower resolution to guide the search for a finer disparity value at the higher resolution, In this process, two factors are taken into account.

Firstly, we consider how the image pyramid is constructed. Within the preferred embodiment the Gaussian pyramid was constructed with window size 5×5, and hence one pixel at the higher resolution contributes up to 9 pixels in the lower resolution image. When we trace back, all these 9 pixels' disparities should be considered to form a disparity search range at that pixel. Therefore, within the preferred embodiment the maximum and minimum of all 9 disparity values at those 9 pixels respectively are selected as two boundaries $d_{min}$ and $d_{max}$ for the formed range. For example, in the 1D case shown in FIG. 9, when constructing the disparity range of pixel $p_n$ at level k, we should take into account all three disparities estimated at pixel $\alpha_{m-1}$, $\alpha_m$, and $\alpha_{m-1}$ in level k+1.

The second consideration is that of the search range for pixels located at discontinuities in the image (i.e. pixels located at the edge of an object in the image or the like). Based on the previous consideration, pixels located at a discontinuity may get a large search range because they get contribution from both sides. However, as we calculate the variance map within a small horizontal segment sized 2w+1 (see discussion of step 8.3), a pixel (x,y) at a discontinuity should have a larger variance than that of its two neighbours (x−w,y) and (x+w,y). By recognising this, we can distinguish pixels at discontinuities. Therefore, within the preferred embodiment after finding that a pixel (x,y) is at discontinuity, we further locate its similar neighbour by comparing its intensity with those of (x−w,y) and (x+w,y). The one (similar neighbour) with a similar intensity as the pixel (x,y) should be at the same edge of the discontinuity. It then becomes possible to reduce the disparity range of pixel (x,y) by intersecting its original range constructed from the lower level with that of its similar neighbour.

The output of the search range construction program 214 at step 8.9 is a search range $d_{min}$ to $d_{max}$ for each pixel in the image with the next higher resolution, which is to be processed next.

Following step 8.9 processing proceeds to step 8.10, wherein the pair of left and right images with the next resolution upwards are retrieved from the image store 224 for processing. The steps 8.3, 8.4, and 8.5 are then performed as described above for the pair of images to obtain disparity maps for the pair.

Figure 8:
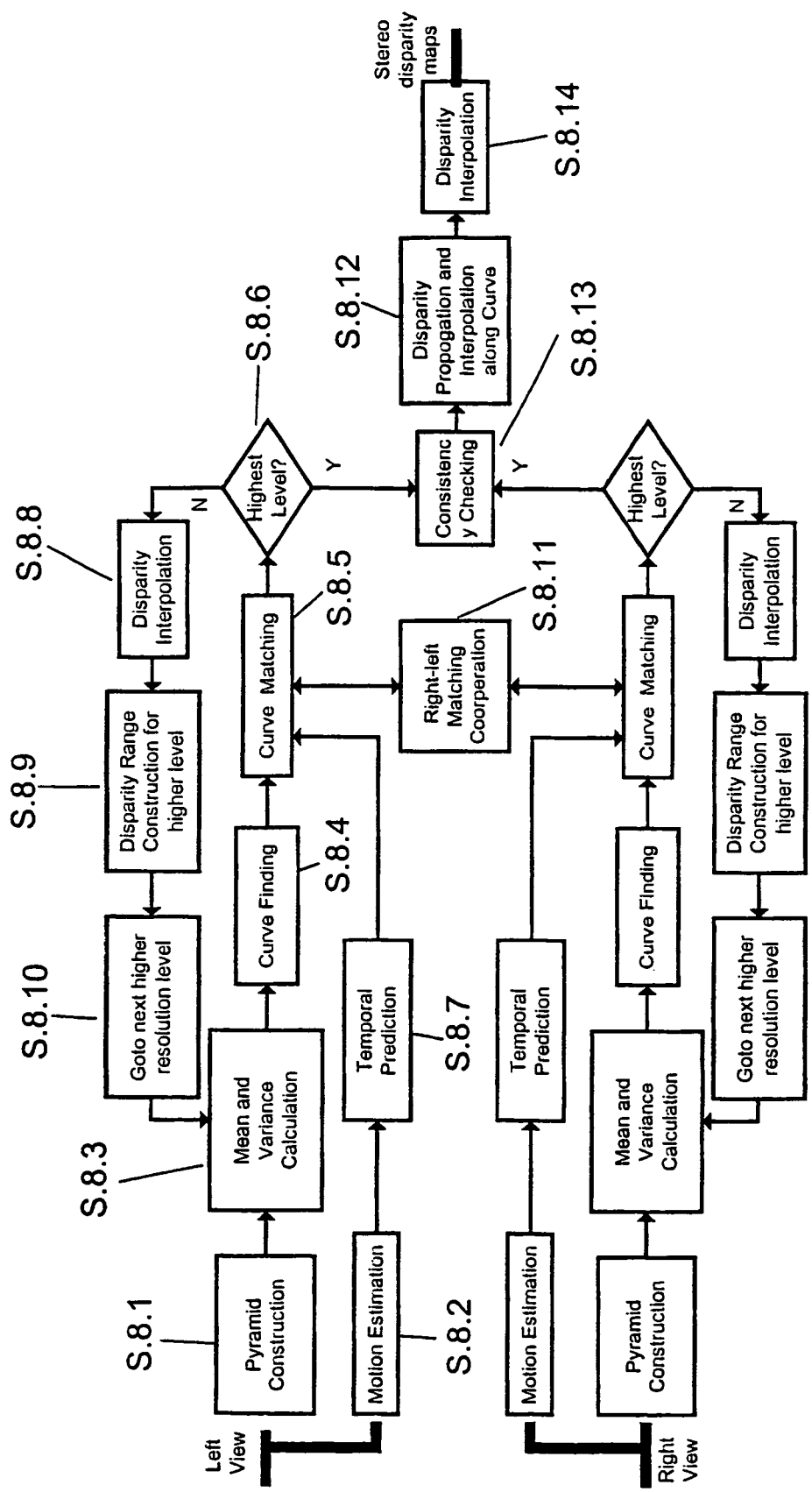
FIG. 8 is a detailed flow diagram illustrating the processing steps involved in a preferred embodiment of the present invention.

It will be apparent from FIG. 8 that the processing loops around once to perform pixel matching for each pair of images at every level in the image pyramid. As was apparent from FIG. 7, the coarsest image pair is always processed first, followed by the next most coarse image pair, and so on until finally the original highest resolution images are processed. This hierarchical processing provides the advantage that computational efficiency is ultimately increased, as the search range for each pixel can be obtained from a consideration of the disparity values already obtained for the pixels in the lower resolution images already processed.

Returning to step 8.6, assume now that the original high-resolution images have been processed, and disparity maps obtained at the high resolution. As should be apparent from the foregoing, the disparity maps thus obtained will be similar to those of FIG. 16, which, whilst substantially complete, will also have holes therein where no validly matching pixel could be found, and hence where no disparity value has been stored in the map. Further processing is therefore needed to fill in the missing disparity values.

In view of this, following step 8.6 once the higher resolution images have been processed processing proceeds to step 8.13, wherein the consistency of the found disparity values is checked by the checking program 216. This is a conventional technique, and by imposing uniqueness constraint, the consistency checking is employed to reject large disparity outliers, as described by Faugeras et al. *Real time correlation-based stereo: algorithm, implementations and applications*. Technical Report 2031, Unité de recherche INRIA Sophia-Antipolis, August 1993. It is done bi-directionally, both from left to right and from right to left. The criterion is:

$$|d_R(x,y)+d_L(x+d_R(x,y),y)| \leq d_{thresh}$$

and $$|d_L(x,y)+d_R(x+d_L(x,y),y)| \leq d_{thresh}$$

where $d_{thresh}$ is the consistency checking threshold. As is common, in the embodiment of the invention we set $d_{thresh}=1$.

Following consistency checking processing proceeds to step 8.12, under the control of the disparity and interpolation program 218. After consistency checking, some holes without any disparity values assigned will appear due to mismatch and occlusions. At step 8.12 the disparity values for pixels in those holes are then filled in by considering all consistent disparity values, as follows.

Due to the specific way that a curve is derived (see discussion of step 8.4), we can argue that, at the highest resolution level, all pixels, within one curve, are likely to reside on the same object without discontinuity. This enables us ideally to propagate and interpolate the disparities along curves (Note: Below, if a pixel has already been assigned a disparity value, then we name it valued, otherwise we say it is unvalued). This is performed in accordance with the following.

For propagation, if a pixel is valued, then we assign its disparity value to all unvalued pixels on the curve centred on it. For interpolation, if a pixel is unvalued, then we locate two valued pixels on its curve but at two sides of it. If we find two such pixels, then we interpolate their disparity values to assign to the current pixel. Note that in the preferred embodiment propagation of disparity values along curves is performed before interpolation of values, such that only those pixels that do not obtain a disparity value due to propagation may obtain a disparity value by interpolation along curves. In alternative embodiments, however, it is possible to perform these two steps in the opposite order.

The above propagation and interpolation along curves will provide a disparity value for most pixels for which the curve matching step failed to find a match. However, there will still be some pixels with no disparity value despite the propagation and interpolation along curves step. These holes are mainly caused by occlusions in the 3D scene. Therefore, at step 8.14 the disparity propagation and interpolation program acts to fill these holes with a disparity value by simple linear interpolation along the respective scan-lines of each pixel. This provides a complete disparity map with a disparity value for every pixel.

Whilst the above description has concentrated on producing a left-to-right disparity map from the left image to the right image, it should be understood by the intended reader that the same operations described are performed symmetrically for the right image to obtain a right-to-left disparity map. This is shown in FIG. 8.

Figure 1:
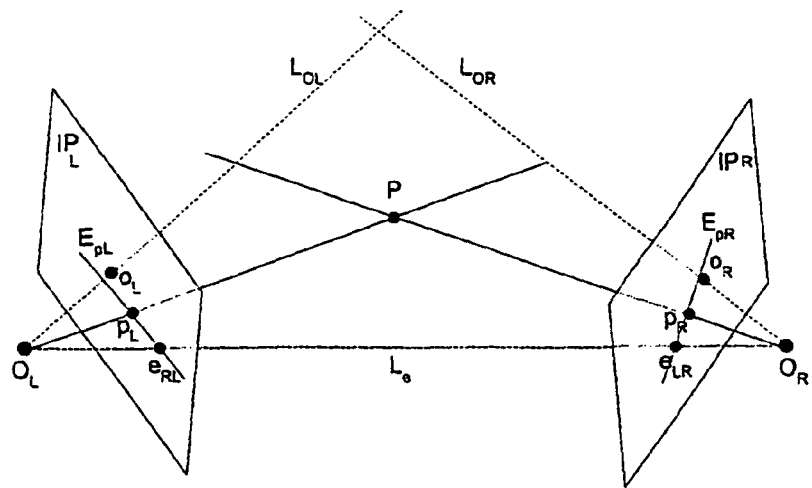
FIG. 1 is a graphical schematic of a typical stereo configuration used for capturing stereo images for use in the present invention.
Figure 2:
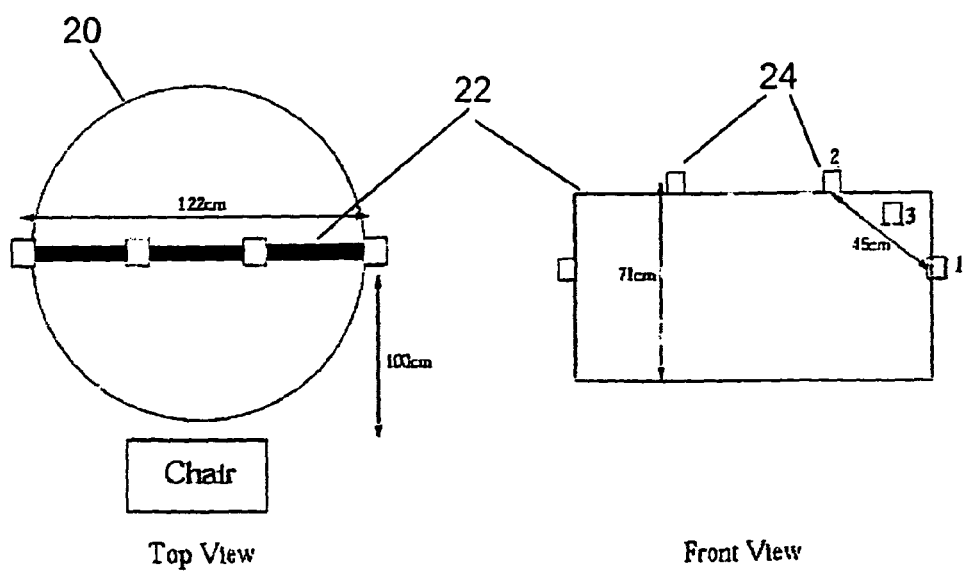
FIG. 2 is a plan and elevation view of the usual arrangement of a prior art video conferencing apparatus.
Figure 3:
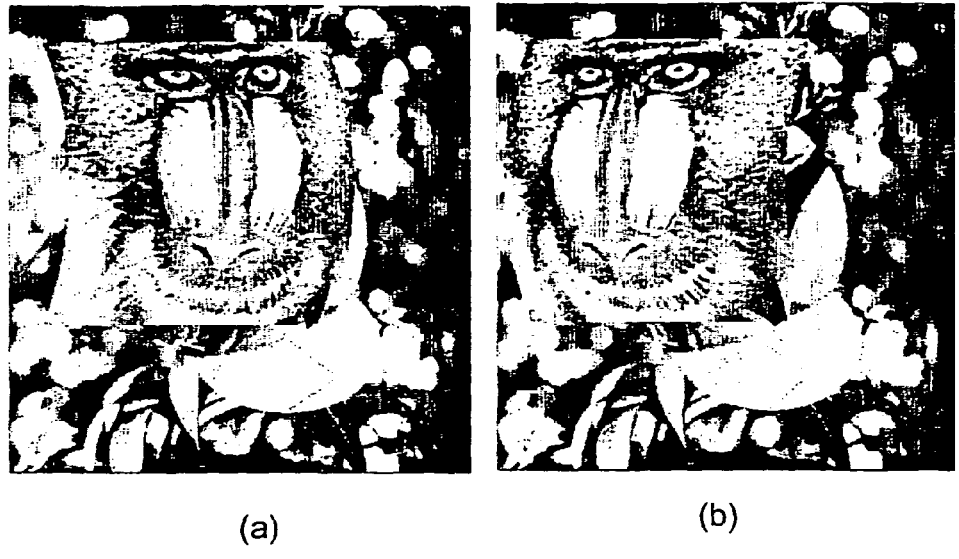
FIG. 3(a) is a synthesised left view of a stereo image pair.
FIG. 3(b) is a synthesised right view of a stereo image pair.
Figure 4:
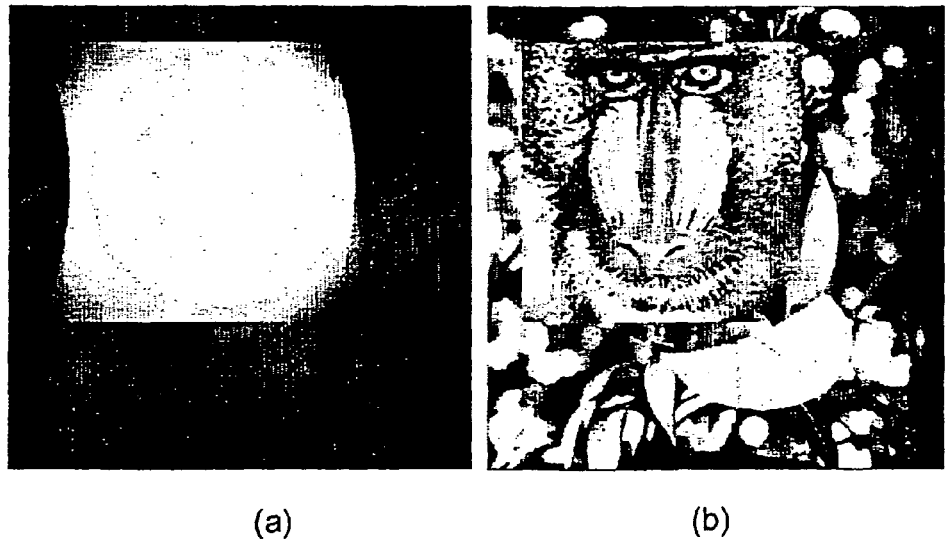
FIG. 4(a) is a synthesised left to right disparity map between FIGS. 3(a) and (b) which is used as a ground truth to test the present invention.
FIG. 4(b) is a synthesised middle view between the left and right FIG. 3 which is used as a ground truth to test the present invention.
Figure 5:
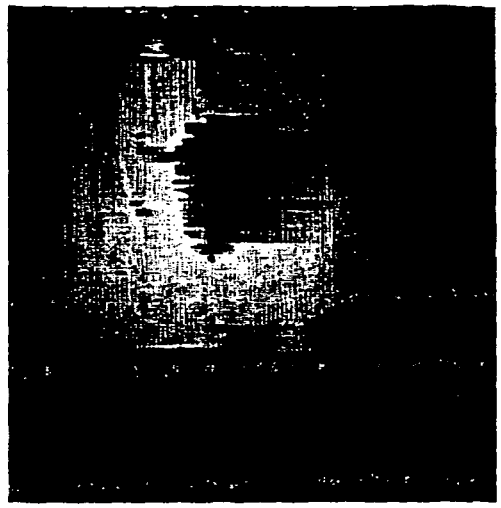
FIG. 5(a) is a left to right disparity map between the stereo images of FIG. 3 generated by a first correspondence estimation technique of the prior art.
FIG. 5(b) is a synthesised middle view using the disparity map of FIG. 5(a)
Figure 5:
Figure 21:
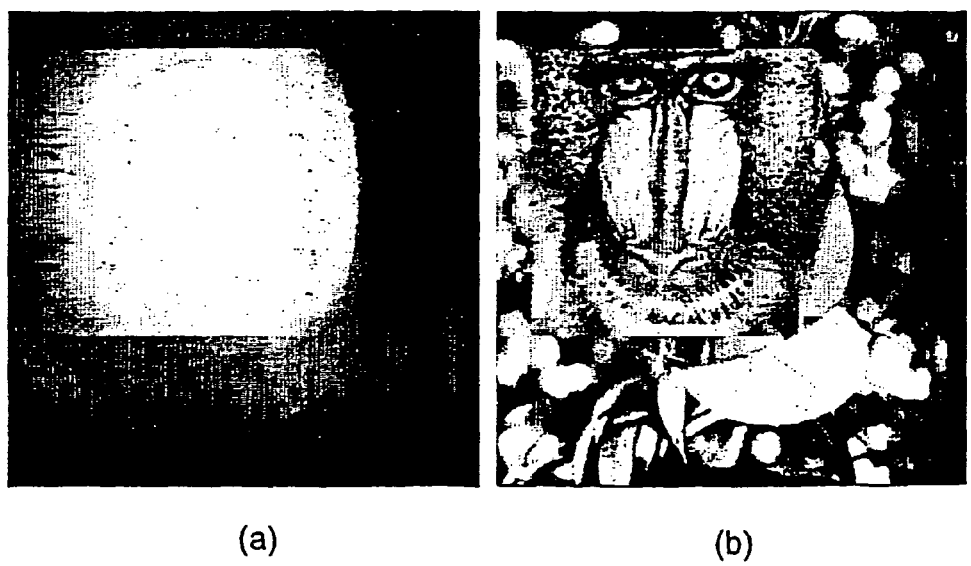
FIG. 21(a) is a left to right disparity map generated by the picture element matching method of the present invention between the synthesised stereo image pair of FIG. 3.
FIG. 21(b) is a synthesised middle view generated according to the third or fourth aspects of the present invention using the disparity maps generated according to the first or second aspects of the present invention.

The output of the method depicted in FIG. 8 and described above is a pair of stereo disparity maps of high quality. FIG. 21(*a*) shows a left to right disparity map generated by the above described preferred embodiment of the pixel matching method and apparatus according to the invention for the stereo image pair of FIG. 3. When compared to the ground-truth left-to-right disparity map of FIG. 4(*a*) it will be seen that, whilst not perfect, the pixel matching method and apparatus of the present invention provides very good results. Furthermore, by comparing FIG. 21(*a*) with either FIG. 5(*a*) or 6(*a*) which depict disparity maps generated by prior art methods, it will be seen that the present invention provides much improved results in comparison with the prior art.

Figure 20:
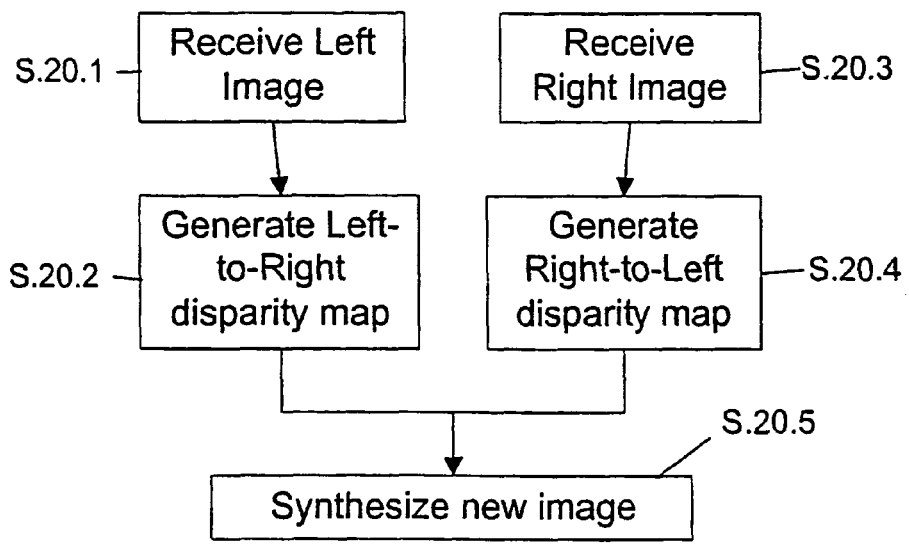
FIG. 20 is a flow diagram illustrating the processing steps according to a method of the third aspect of the present invention.

An embodiment of the pixel matching method and apparatus of the present invention has been described above. However, the real purpose of performing the pixel matching is to obtain matching information in the form of the stereo disparity maps which can then be used to synthesize new images showing different views of the scene depicted in the input stereo images. Therefore, according to the present invention the preferred embodiment also includes the image synthesis program 220, which operates to use the disparity maps generated by the pixel matching process of FIG. 8 to generate novel image, usually showing the scene depicted in the input images from a different viewpoint. The overall operation of such an image synthesis method and apparatus is shown in FIG. 20, and described next in the context of a video-conference over a telecommunications network.

Here, at step 20.1 and step 20.3 respectively a left image and a right image depicting the scene at the opposite end of the video-conferencing link are received over the network 196 by the data I/O interface 194, and transferred via the data bus 190 to the image store 224. Then, at steps 20.2 and 20.4 respectively the left-to-right and right-to-left disparity maps for the images are generated as previously described with respect to FIGS. 7 and 8. Following this, at step 20.5 the matching information thus obtained and represented by the disparity maps is used by the image synthesis program 220 to control the CPU to generate a new image of the scene, which is then output to the display screen 204 via the display controller 198.

The precise operation of the image synthesis program is beyond the scope of the present invention, but suitable techniques are known in the art to perform image synthesis, and which may form the basis of the image synthesis program 220. In particular, B J Lei and E A Hendriks *Multi-step view synthesis with occlusion handling*, Proceedings of Vision, Modelling and Visualisation (VMV01), Stuttgart, Germany, (November 2001) describes a particularly suitable technique, and the contents thereof relating to the generation of novel images from stereo disparity maps are incorporated herein by reference.

Figure 6:
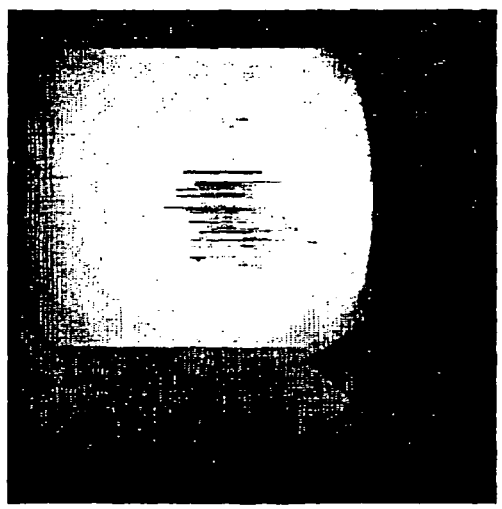
FIG. 6(a) is a left to right disparity map generated by a second correspondence estimation algorithm of the prior art.
FIG. 6(b) is a synthesised middle view using the disparity map of FIG. 6(a)
Figure 6:

The good quality of the stereo disparity maps obtained using the present invention is propagated onwards to the quality of the novel images synthesised using the maps. FIG. 21(b) shows a synthesised middle view of the stereo pair of FIG. 3, generated by the preferred embodiment of the invention. When compared to the ground-truth middle view of FIG. 4(b) it will be seen that some anomalies exist, and in particular around the edges of the foremost surface textured with the baboon's face, but that such anomalies are generally insignificant. Furthermore, when compared to the images in FIGS. 5(b) and 6(b) synthesised by the same image synthesis technique as FIG. 21(b), but using the disparity maps of FIGS. 5(a) and 6(a) respectively generated by prior art methods, it will be seen that a great improvement in synthesised image quality is obtained by the present invention when compared to the prior art.

The invention claimed is:

1. A computer implemented method of matching picture elements between at least a first image and a second image each comprising a plurality of picture elements, the method comprising the steps of:
   using at least one computer with accessible input/output to perform the following:
   selecting a first picture element within the first image to be matched within the second image, said first and second images being respective images of a stereo image pair;
   constructing a first sequence of connected picture elements within the first image, the sequence including the first picture element, wherein each picture element within the sequence possesses one or more intensity or chrominance characteristics most similar to the first picture element than other surrounding picture elements; and
   searching the picture elements of the second image using the constructed sequence as a matching element to find a substantially corresponding picture element within the second image to the first picture element,
   wherein the constructing step comprises searching the picture elements in a first direction from the first picture element to determine a first chain of connected picture elements to form part of the first sequence, and searching the picture elements in a second direction, substantially opposite to the first direction, to determine a second chain of connected picture elements to form part of the first sequence, and
   the first chain of connected picture elements and the second chain of connected picture elements form a sequence of at least three picture elements that are substantially in a line.

2. A method according to claim 1 wherein for any particular picture element to be searched in the second image, the searching step comprises:
   determining within the second image a corresponding sequence of picture elements including the picture element to be searched to the first sequence of picture elements; and
   comparing the characteristics of the picture elements in the first sequence with the characteristics of the picture elements in the corresponding sequence to derive a cost value indicative of the degree of matching,
   wherein a picture element in the second image is matched with the first picture element if its cost value indicates the highest degree of matching from those picture elements in the second image which have been searched.

3. A method according to claim 2, wherein the characteristics of the picture elements compared include one or more of picture element intensity, a mean value of intensity, and/or variance of intensity.

4. A method according to claim 3, wherein for a particular picture element, the mean value of intensity is the average of the intensity of a segment of w adjacent picture elements including the particular picture element.

5. A method according to claim 3 wherein the variance of intensity is the variance of the intensity a segment of w adjacent picture elements including the particular picture element.

6. A method according to claim 5, wherein the calculated variance value is rendered negative if the segment w of adjacent picture elements has a greater sum of picture element intensities at one of either the left or right sides of the segment.

7. A method according to claim 2, wherein the cost value for a particular picture element being searched in the second image is calculated as follows:

$$C(x, y, d) = \frac{1}{S_{A(x,y)}} \cdot \sum_{(m,n) \in A(x,y)} \frac{(I_A(m,n) - I'_{A'}(m',n))^2 + (M_A(m,n) - M'_{A'}(m',n))^2 + (V_A(m,n) - V'_{A'}(m',n))^2}{|I_A(m,n) \cdot I'_{A'}(m',n)|}$$

wherein
   C(x,y,d) is the cost value generated for comparing picture element (x+d,y) in the second image with the first picture element (x,y);
   A(x,y) and A'(x+d,y) represents, respectively, the sequence of picture elements in the first and second image, having a candidate disparity d;
   $S_A(x,y)$ is the size of the sequence of picture elements A(x,y);
   $I_A(p,q)$ and $I'_A(p',q)$ is the intensity of picture element (p,q) and (p',q), respectively, on A(x,y) and A'(x+d,y);
   $M_A(p,q)$ and $M'_A(p',q)$ is the mean intensity of picture element (p,q) and (p',q), respectively, on A(x,y) and A'(x+d,y); and
   $V_A(p,q)$ and $V'_A(p',q)$ is the variance of intensity of picture element (p,q) and (p',q), respectively, on A(x,y) and A'(x+d,y).

8. A method according to claim 1, wherein the searching step further includes the step of predicting a picture element in the second image at which to start searching based upon previous matches obtained for other picture elements.

9. A method according to claim 8, wherein the predicting step further includes the step of selecting a starting picture element in the second image based upon a previous match obtained for another connected picture element to the first picture element.

10. A method according to claim 8, wherein the predicting step further includes the step of selecting a starting picture element in the second image based upon a previous match obtained for another picture element which is a member of the first sequence.

11. A method according to claim 8, wherein the predicting step further includes the step of selecting a starting picture element in the second image based upon a previous match obtained for another picture element for which the first picture element is a member of the sequence constructed according to the constructing step for the other picture element.

12. A method according to claim 8, wherein the predicting step further includes the step of selecting a picture element in the second image based upon a previous match obtained for a corresponding picture element in a temporally displaced version of the first image to the first picture element.

13. A method according to claim 1, and further comprising the steps of:
generating a plurality of versions of each of the first and second images, each version of each image having a different resolution to the other versions of the same image, but the same resolution as the corresponding version of the other image, and
performing picture element matching between each corresponding version of the first and second images,
wherein picture element matching is performed between versions with a lower resolution prior to versions with a higher resolution.

14. A method according to claim 13, wherein, for versions of the first and second images other than the lowest resolution the searching step further comprises the step of determining a search range of picture elements in the second image to be searched based upon previous matches obtained for corresponding picture elements in one or more of the lower resolution versions of the images.

15. A method according to claim 1, and further comprising the step of checking that the picture element in the second image found by the searching step meets one or more predetermined parameters with respect to the matching picture elements to other picture elements in the first image adjacent to or surrounding the first picture element; and discarding the match if the parameters are not met.

16. A method according to claim 15, wherein one of the parameters is the continuity of the matched picture element with respect to previously matched adjacent or surrounding picture elements.

17. A method according to claim 15, wherein one of the parameters is the ordering of the matched picture element with respect to previously matched adjacent or surrounding picture elements.

18. A method according to claim 1, wherein when the searching step is unable to find a match for the first picture element, the method further comprises the steps of:
locating a matching previously made for another picture element in the first image for which the first picture element is a member of the sequence constructed for the other picture element according to the constructing step; and
matching the first picture element with a picture element in the second image which exhibits the same spatial displacement within the second image with respect to the position of the first picture element in the first image as the picture element within the second image matched to the other picture element in the first image exhibits with respect to the position of the other picture element within the first image.

19. A method according to claim 1, wherein when the searching step is unable to find a match for the first picture element, the method further comprises the steps of: locating the matching previously made for other picture elements in the first image which are members of the sequence constructed for the first picture element by the constructing steps,
for each located matching pair, determining a displacement vector (d) representative of the spatial displacement of the position of the matched picture element within the second image with respect to the position of the corresponding other picture element in the first image;
interpolating between the determined displacement vectors to find an average resultant displacement vector; and
applying the resultant vector to the corresponding position within the second image of the first picture element within the first image to locate the matching picture element within the second image.

20. An apparatus for matching picture elements between at least a first image and a second image each comprising a plurality of picture elements, comprising:
element selecting means for selecting a first picture element within the first image to be matched within the second image said first and second images being respective images of a stereo image pair;
sequence construction means for constructing a first sequence of connected picture elements within the first image and including the first picture element, wherein each picture element within the sequence possesses one or more intensity or chrominance characteristics most similar to the first picture element than other surrounding picture elements; and
image searching means for searching the picture elements of the second image using the constructed sequence as a matching element to find a substantially corresponding picture element within the second image to the first picture element;
wherein the constructing means is arranged to search the picture elements in a first direction from the first picture element to determine a first chain of connected picture elements to form part of the first sequence, and searching the picture elements in a second direction, substantially opposite to the first direction, to determine a second chain of connected picture elements to form part of the first sequence, and
the first chain of connected picture elements and the second chain of connected picture elements form a sequence of at least three picture dements that are substantially in a line.

21. An apparatus according to claim 20, wherein the image searching means comprises:
sequence determination means for determining for any particular picture element to be searched in the second image, a corresponding sequence of picture elements including the picture element to be searched the first sequence of picture elements; and
element comparison means for comparing the characteristics of the picture elements in the first sequence with the characteristics of the picture elements in the corresponding sequence to derive a cost value indicative of the degree of matching,
wherein the image searching means is operable to match a picture element in the second image with the first picture element if its cost value indicates the highest degree of matching from the picture elements in the second image which have been searched.

22. An apparatus according to claim 21, wherein the characteristics of the picture elements compared include one or more of picture element intensity, a mean value of intensity, and/or variance of intensity.

23. An apparatus according to claim 22, wherein for a particular picture element, the mean value of intensity is the average of the intensity of a segment of w adjacent picture elements including the particular picture element.

24. An apparatus according to claim 22 wherein the variance of intensity is the variance of the intensity a segment of w adjacent picture elements including the particular picture elements.

25. An apparatus according to claim 24, wherein the calculated variance value is rendered negative if the segment w of adjacent picture elements has a greater sum of picture element intensities at one of either the left or right sides of the segment.

26. An apparatus according to claim 21, wherein the cost value for a particular picture element being searched in the second image is calculated as follows:

$$C(x, y, d) = \frac{1}{S_{A(x,y)}} \cdot \sum_{(m,n) \in A(x,y)} \frac{(I_A(m,n) - I'_{A'}(m',n))^2 + (M_A(m,n) - M'_{A'}(m',n))^2 + (V_A(m,n) - V'_{A'}(m',n))^2}{|I_A(m,n) \cdot I'_{A'}(m',n)|}$$

wherein
C(x,y,d) is the cost value generated for comparing picture element (x+d,y) in the second mage with the first picture element (x,y);
A(x,y) and A'(x+d,y) represents, respectively, the sequence of picture elements in the first and second image, having a candidate disparity d;
$S_{A(x,y)}$ is the size of the sequence of picture elements A(x, y);
$I_A(p,q)$ and $I'_{A'}(p',q)$ is the intensity of picture element (p,q) and (p',q), respectively, on A(x,y) and A'(x+d,y);
$M_A(p,q)$ and $M'_{A'}(p',q)$ is the mean intensity of picture element (p,q) and (p',q), respectively, on A(x,y) and A'(x+d,y); and
$V_A(p,q)$ and $V'_{A'}(p',q)$ is the variance of intensity of picture element (p,q) and (p',q), respectively, on A(x,y) and A'(x+d,y).

27. An apparatus according to claim 20, wherein the image searching means further include prediction means for predicting a picture element in the second image at which to start searching based upon previous matches obtained for other picture elements.

28. An apparatus according to claim 27, wherein the prediction means further includes first selection means for selecting a starting picture element in the second image based upon a previous match obtained for another connected picture element to the first picture element.

29. An apparatus according to claim 27, wherein the prediction means further includes second selection means for selecting a starting picture element in the second image based upon a previous match obtained for another picture element which is a member of the first sequence.

30. An apparatus according to claim 27, wherein the prediction means further includes third selection means for selecting a starting picture element in the second image based upon a previous match obtained for another picture element for which, the first picture element is a member of the sequence constructed by the sequence construction means for the other picture element.

31. An apparatus according to claim 27, wherein the prediction means further includes temporal selection means for selecting a picture element in the second image based upon a previous match obtained for a corresponding picture element in a temporally displaced version of the first image to the first picture element.

32. An apparatus according to claim 20, and further comprising:
image version generating means for generating a plurality of versions of each of the first and second images, each version of each image having a different resolution to the other versions of the same image, but the same resolution as the corresponding version of the other image, and
wherein the apparatus of the invention is further arranged to perform picture element matching between each corresponding version of the first and second images,
wherein picture element matching is performed between versions with a lower resolution prior to versions with a higher resolution.

33. An apparatus according to claim 32, wherein the image searching means further comprises search range determination means for determining a search range of picture elements in the second image to be searched based upon previous matches obtained for corresponding picture elements in one or more of the lower resolution versions of the images.

34. An apparatus according to claim 20, and further comprising checking means for checking that the picture element in the second image found by the image searching means meets one or more predefined parameters with respect to the matching picture elements to other picture elements in the first image adjacent to or surrounding the first picture element; and discarding the match if the parameters are not met.

35. An apparatus according to claim 34, wherein one of the parameters is the continuity of the matched picture element with respect to previously matched adjacent or surrounding picture elements.

36. An apparatus according to claim 34, wherein one of the parameters is the ordering of the matched picture element with respect to previously matched adjacent or surrounding picture elements.

37. An apparatus according to claim 20, further comprising the image searching means:
matching location means for locating a matching previously made for another picture element in the first image for which the first picture element is a member of the sequence constructed for the other picture element by the sequence construction means; and
auxiliary matching means for matching the first picture element with a picture element in the second image which exhibits the same spatial displacement within the second image with respect to the position of the first picture element in
the first image as the picture element within the second image matched to the other picture element in the first image exhibits with respect to the position of the other picture element within the first image;
wherein the matching location means and auxiliary matching means are operable when the image searching means is unable to find a match for the first picture element.

38. An apparatus according to claim 20, further comprising:
- matching location means for locating the matching previously made for other picture elements in the first image which are members of the sequence constructed for the first picture element by the sequence construction means;
- vector determination means for, for each located matching pair, determining a displacement vector (d) representative of the spatial displacement of the position of the matched picture element within the second image with respect to the position of the corresponding other picture element in the first image;
- interpolation means for interpolating between the determined displacement vectors to find an average resultant displacement vector; and
- vector matching means for applying the resultant vector to the corresponding position within the second image of the first picture element within the first image to locate the matching picture element within the second image.

39. A non-transitory computer-readable storage medium storing a program for a computer, which, when run on a computer controls the computer to perform a method according to claim 1.

* * * * *